United States Patent
Huang et al.

(10) Patent No.: US 12,541,713 B2
(45) Date of Patent: Feb. 3, 2026

(54) METHOD, APPARATUS, AND COMPUTER DEVICE AND STORAGE MEDIUM FOR DISTRIBUTED TRAINING OF MACHINE LEARNING MODEL

(71) Applicant: TENCENT TECHNOLOGY (SHENZHEN) COMPANY LIMITED, Guangdong (CN)

(72) Inventors: Hao Huang, Shenzhen (CN); Wei Qu, Shenzhen (CN); Haoxiang Hou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 769 days.

(21) Appl. No.: 17/887,702

(22) Filed: Aug. 15, 2022

(65) Prior Publication Data

US 2022/0391771 A1   Dec. 8, 2022

Related U.S. Application Data

(63) Continuation of application No. PCT/CN2021/106476, filed on Jul. 15, 2021.

(30) Foreign Application Priority Data

Aug. 19, 2020 (CN) .......................... 202010836317.4

(51) Int. Cl.
| | | |
|---|---|---|
| G06F 7/00 | (2006.01) |
| G06N 20/00 | (2019.01) |
| G06Q 30/0251 | (2023.01) |

(52) U.S. Cl.
CPC ......... G06N 20/00 (2019.01); G06Q 30/0251 (2013.01)

(58) Field of Classification Search
CPC .......................... G06N 20/00; G06Q 30/0251
(Continued)

(56) References Cited

U.S. PATENT DOCUMENTS

2019/0318268 A1   10/2019   Wang et al.
2020/0342595 A1*  10/2020   Jia .......................... G06T 7/0012

FOREIGN PATENT DOCUMENTS

| CN | 108154237 A | 6/2018 |
|---|---|---|
| CN | 110020877 A | 7/2019 |
| CN | 110929878 A | 3/2020 |

OTHER PUBLICATIONS

Chinese Office Action for 202010836317.4 dated Oct. 10, 2020.
(Continued)

*Primary Examiner* — Isaac M Woo
(74) *Attorney, Agent, or Firm* — Sughrue Mion, PLLC

(57) ABSTRACT

A method, apparatus, computer device and storage medium for distributed training of a machine learning model. The method includes: obtaining more than one group of training samples, and processing each group of training samples separately according to a current training parameter of a machine learning model to obtain a corresponding parameter gradient; determining a local gradient of a current training process based on the parameter gradient corresponding to each group of training samples; transmitting the local gradient of the current training process to a parameter node; and obtaining the updated training parameter from the parameter node, and performing model training on the machine learning model based on the updated training parameter until a training end condition is met.

20 Claims, 8 Drawing Sheets

(58) Field of Classification Search
USPC .................................. 707/600–899; 706/12
See application file for complete search history.

(56) References Cited

OTHER PUBLICATIONS

Chinese Office Action for 202010836317.4 dated Oct. 30, 2020.
Chinese Office Action for 202010836317.4 dated Nov. 23, 2020.
International Search Report for PCT/CN2021/106476 dated Oct. 21, 2021 (PCT/ISA/210).
Written Opinion of the International Searching Authority for PCT/CN2021/106476 dated Oct. 21, 2021 (PCT/ISA/237).

* cited by examiner

METHOD, APPARATUS, AND COMPUTER DEVICE AND STORAGE MEDIUM FOR DISTRIBUTED TRAINING OF MACHINE LEARNING MODEL

CROSS-REFERENCE TO RELATED APPLICATION(S)

This application is a continuation application of International Application No. PCT/CN2021/106476, filed on Jul. 15, 2021, which claims priority to Chinese Patent Application No. 202010836317.4, filed with the China National Intellectual Property Administration on Aug. 19, 2020, the disclosures of which are incorporated by reference in their entireties.

FIELD

The present disclosure relates to the field of artificial intelligence technologies, and in particular, to a method, apparatus, and computer device and storage medium for distributed training of a machine learning model.

BACKGROUND

With the development of computer technologies, the use of machine learning for data processing has become more and more common. The process of machine learning usually refers to that a computer device constructs an initial model, inputs sample data into the initial model, analyzes the inputted sample data through a series of algorithms, and updates model parameters of the initial model through iterative training to obtain a final appropriate model.

Since the machine learning model needs to learn features in a large amount of sample data during the training process, conventional schemes adopt a plurality of worker nodes to undertake the training task in order to improve the learning efficiency. In conventional methods, training is usually performed once in the worker nodes according to the sample data and a parameter gradient is obtained; then the parameter gradient of the one training is transmitted to a parameter node to update training parameters in the parameter node, to finally obtain a trained model.

However, as the amount of training data becomes larger and larger, the number of communication interactions between the worker nodes and the parameter node increases, and traffic at the network adapter of the parameter node also increases considerably, which reduces the efficiency of updating the training parameters, resulting in low efficiency of model training.

SUMMARY

Embodiments of the disclosure provide a method, apparatus, computer device and storage medium for distributed training of a machine learning model.

A method for distributed training of a machine learning model, performed by a computer device, the method may include: obtaining more than one group of training samples, and processing each group of training samples separately according to a current training parameter of a machine learning model to obtain a corresponding parameter gradient; determining a local gradient of a current training process based on the parameter gradient corresponding to each group of training samples; transmitting the local gradient of the current training process to a parameter node, the transmitted local gradient being used for instructing the parameter node to determine a global gradient of the current training process based on a local gradient set of the current training process, and update the training parameter according to the global gradient of the current training process, and the local gradient set of the current training process including local gradients respectively transmitted by worker nodes in a distributed node cluster in the current training process; and obtaining the updated training parameter from the parameter node, using the updated training parameter as a new current training parameter in a next training cycle, returning to the operation of obtaining more than one group of training samples and processing each group of training samples respectively according to the new current training parameter of the machine learning model to obtain a corresponding parameter gradient, and continuing to perform the training until a training end condition is met.

An apparatus for distributed training of a machine learning model, the apparatus may include: an obtaining module, configured to obtain more than one group of training samples, and processing each group of training samples separately according to a current training parameter of a machine learning model to obtain a corresponding parameter gradient; a first determining module, configured to determine a local gradient of a current training process based on the parameter gradient corresponding to each group of training samples; a transmission module, configured to transmit the local gradient of the current training process to a parameter node, the transmitted local gradient being used for instructing the parameter node to determine a global gradient of the current training process based on a local gradient set of the current training process, and update the training parameter according to the global gradient of the current training process, and the local gradient set of the current training process including local gradients respectively transmitted by worker nodes in a distributed node cluster in the current training process; and a training module, configured to obtain the updated training parameter from the parameter node, use the updated training parameter as a new current training parameter in a next training cycle, return to the operation of obtaining more than one group of training samples and processing each group of training samples respectively according to the new current training parameter of the machine learning model to obtain a corresponding parameter gradient, and continue to perform the training until a training end condition is met.

A computer device may include a memory and one or more processors, the memory storing computer-readable instructions, and when being executed by the processors, the computer-readable instructions causing the one or more processors to perform the following operations: obtaining more than one group of training samples, and processing each group of training samples separately according to a current training parameter of a machine learning model to obtain a corresponding parameter gradient; determining a local gradient of a current training process based on the parameter gradient corresponding to each group of training samples; transmitting the local gradient of the current training process to a parameter node, the transmitted local gradient being used for instructing the parameter node to determine a global gradient of the current training process based on a local gradient set of the current training process, and update the training parameter according to the global gradient of the current training process, and the local gradient set of the current training process including local gradients respectively transmitted by worker nodes in a distributed node cluster in the current training process; and obtaining the updated training parameter from the parameter node, and performing model training on the machine learning model based on the updated training parameter until a training end condition is met.

One or more non-volatile readable storage mediums storing computer-readable instructions are provided, the computer-readable instructions, when executed by one or more processors, may cause the one or more processors to perform the following operations: obtaining more than one group of training samples, using the updated training parameter as a current training parameter in a next training cycle, returning to the operation of obtaining more than one group of training samples and processing each group of training samples respectively according to a current training parameter of a machine learning model to obtain a corresponding parameter gradient, to obtain the corresponding parameter gradient; determining a local gradient of a current training process based on the parameter gradient corresponding to each group of training samples; transmitting the local gradient of the current training process to a parameter node, the transmitted local gradient being used for instructing the parameter node to determine a global gradient of the current training process based on a local gradient set of the current training process, and update the training parameter according to the global gradient of the current training process, and the local gradient set of the current training process including local gradients respectively transmitted by worker nodes in a distributed node cluster in the current training process; and obtaining the updated training parameter from the parameter node, using the updated training parameter as a new current training parameter in a next training cycle, returning to the operation of obtaining more than one group of training samples and processing each group of training samples respectively according to the new current training parameter of the machine learning model to obtain a corresponding parameter gradient, and continuing to perform the training until a training end condition is met.

A method for distributed training of a machine learning model, performed by a computer device, the method may include: receiving, in a current training cycle, local gradients respectively transmitted by worker nodes in a distributed node cluster, each local gradient being determined by a parameter gradient obtained by the corresponding worker node by processing each group of training samples in more than one group of training samples according to a current training parameter of a machine learning model; determining a global gradient of the current training process based on local gradients respectively transmitted by worker nodes in the distributed node cluster in the current training process; and updating the training parameter according to the global gradient of the current training process, the updated training parameter being used for being transmitted to the worker nodes in the distributed node cluster to trigger the worker nodes to continue to perform model training on the machine learning model based on the updated training parameter until a training end condition is met.

An apparatus for distributed training of a machine learning model, may include: a receiving module, configured to receive, in a current training cycle, local gradients respectively transmitted by worker nodes in a distributed node cluster, each local gradient being determined by a parameter gradient obtained by the corresponding worker node by processing each group of training samples in more than one group of training samples according to a current training parameter of a machine learning model; a second determining module, configured to determine a global gradient of the current training process based on local gradients respectively transmitted by worker nodes in the distributed node cluster in the current training process; and an updating module, configured to update the training parameter according to the global gradient of the current training process, the updated training parameter being used for being transmitted to the worker nodes in the distributed node cluster to trigger the worker nodes to continue to perform model training on the machine learning model based on the updated training parameter until a training end condition is met.

A computer device may include a memory and one or more processors, the memory storing computer-readable instructions, and when being executed by the processors, the computer-readable instructions causing the one or more processors to perform the following operations: receiving, in a current training cycle, local gradients respectively transmitted by worker nodes in a distributed node cluster, each local gradient being determined by a parameter gradient obtained by the corresponding worker node by processing each group of training samples in more than one group of training samples according to a current training parameter of a machine learning model; determining a global gradient of the current training process based on local gradients respectively transmitted by worker nodes in the distributed node cluster in the current training process; and updating the training parameter according to the global gradient of the current training process, the updated training parameter being used for being transmitted to the worker nodes in the distributed node cluster to trigger the worker nodes to continue to perform model training on the machine learning model based on the updated training parameter until a training end condition is met.

One or more non-volatile readable storage mediums storing computer-readable instructions are provided, the computer-readable instructions, when executed by one or more processors, may cause the one or more processors to perform the following operations: receiving, in a current training cycle, local gradients respectively transmitted by worker nodes in a distributed node cluster, each local gradient being determined by a parameter gradient obtained by the corresponding worker node by processing each group of training samples in more than one group of training samples according to a current training parameter of a machine learning model; determining a global gradient of the current training process based on local gradients respectively transmitted by worker nodes in the distributed node cluster in the current training process; and updating the training parameter according to the global gradient of the current training process, the updated training parameter being used for being transmitted to the worker nodes in the distributed node cluster to trigger the worker nodes to continue to perform model training on the machine learning model based on the updated training parameter until a training end condition is met.

DESCRIPTION OF EMBODIMENTS

Distributed training is a process of parallel training performed by a plurality of independent nodes. To be specific, a distributed training cluster in distributed training may be a parameter server architecture including one or more parameter nodes and a plurality of worker nodes. The architectural form of the distributed training cluster is not particularly limited thereto. Each worker node uses different training samples to separately calculate parameter gradients for a to-be-trained model, and transmits the parameter gradients to the one or more parameter nodes in the parameter server architecture.

A method for distributed training of a machine learning model may be applied to any data processing device including a Graphics Processing Unit (GPU). The data processing device may be a terminal, including a Personal Computer (PC), a minicomputer, a midrange computer, a mainframe, a workstation, etc. Of course, the data processing device may also be a server. The data processing device may be independent or exist in the form of a cluster when used for training the method for distributed training of a machine learning model.

The method for distributed training of a machine learning model may be stored in the data processing device in the form of a computer program, and the data processing device runs the computer program to implement the method for distributed training of a machine learning model. The computer program may be an independent computer program, or may be a functional module, a plug-in, or a small program integrated on another computer program.

A plurality of independent nodes in the distributed training cluster may perform model training on one machine or on different machines. Depending on the type of work performed, nodes in the distributed training cluster may be divided into nodes with two different functions, such as worker nodes and parameter nodes. The worker node is a node that performs reading of training samples and performs forward and backward (forward propagation and back propagation) calculations during model training and obtain a parameter gradient. Specifically, the worker node receives training samples as input data, and outputs parameter gradients of the machine learning model. The parameter node is a node that stores a training parameter in the machine learning model training process in its own process, collects the parameter gradients produced by the worker nodes, and updates a variable value of the training parameter. Specifically, the parameter node receives the parameter gradients outputted by the worker nodes as input data, and outputs the updated training parameter obtained by performing parameter updating according to the parameter gradients.

Figure 1:
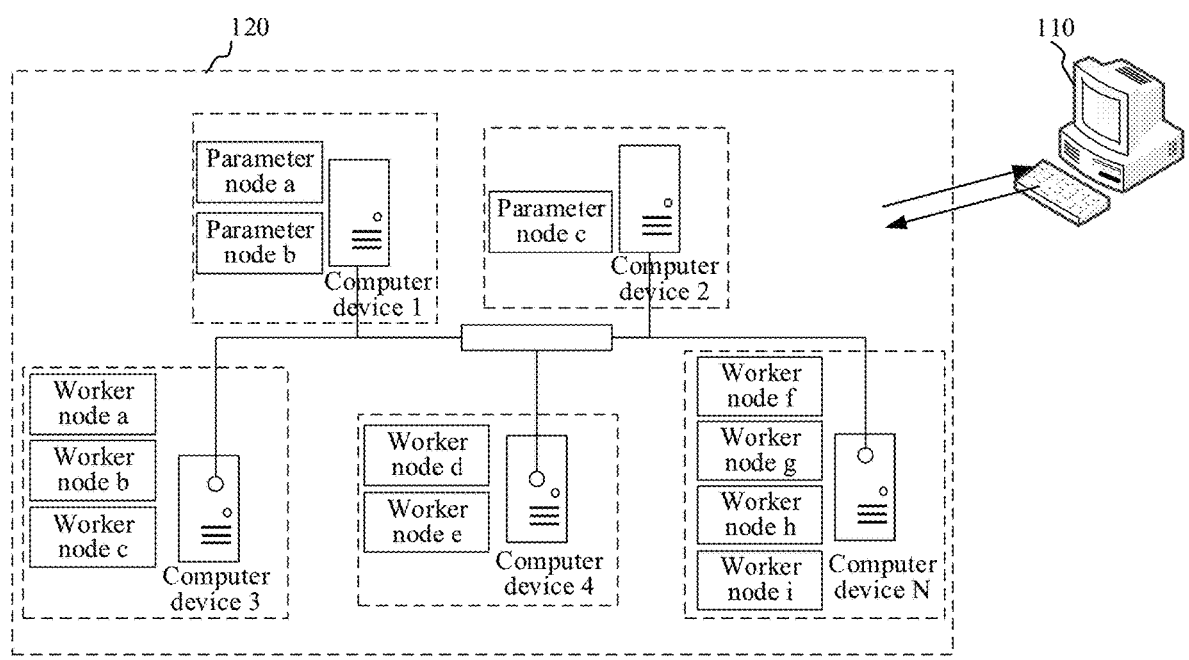
FIG. 1 is a diagram showing an application environment of a method for distributed training of a machine learning model according to some embodiments.

FIG. 1 is a diagram showing an application environment of a method for distributed training of a machine learning model according to some embodiments. A distributed training cluster 120 provided in FIG. 1 is described by taking a parameter server architecture as an example. The distributed training cluster 120 includes a parameter node sub-cluster composed of a plurality of parameter nodes, and the parameter node sub-cluster includes parameter node a, parameter node b, parameter node c, etc. It can be understood that the above number of parameter nodes is only an example, and is not intended to limit the application scenario of the embodiments. The above parameter nodes may be specifically distributed on the same computer device, or may be distributed on different computer devices. The distributed training cluster 120 also includes a worker node sub-cluster composed of a plurality of worker nodes, and the worker node sub-cluster includes worker node a, worker node b, worker node c, worker node d, worker node e, worker node f, worker node g, worker node h, worker node i, etc. It can be understood that the above number of worker nodes is only an example, and is not limit thereto. The above worker nodes may be specifically distributed on the same computer device, or may be distributed on different computer devices. Each of the worker nodes and the parameter nodes has a machine learning model to be trained and a local training parameter. Each worker node calculates parameter gradients separately according to different training samples, and transmits the parameter gradients to the parameter node. When receiving the parameter gradients respectively transmitted by all the worker nodes in the worker node sub-cluster, the parameter node updates the training parameter, so that each worker node executes the next round of machine learning model training according to the updated training parameter. Moreover, each of the parameter nodes and the worker nodes corresponds to a computer device, and data processing is performed in the computer device. In addition, each worker node in the worker node sub-cluster may also be in communication connection with a terminal 110. For example, each worker node may obtain training samples from the terminal 110. It can be understood that the number of parameter nodes and the number of worker nodes may be set according to specific scenarios, and are not limited to the number of parameter nodes and the number of worker nodes in FIG. 1.

It can be understood that the worker nodes and the parameter nodes may each be implemented by a program or service deployed on one or more computer devices, and specifically may be a process for implementing a corresponding type of function, or referred to as a job. For example, the worker node may specifically be a worker process, and the parameter node may specifically be a parameter process. In some other scenarios, the worker nodes and the parameter nodes may each be implemented by a separate server. For example, the worker node may also be referred to as a worker server, and the parameter node may also be referred to as a parameter server.

The computer device may specifically be a server, and the server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited thereto.

Figure 2:
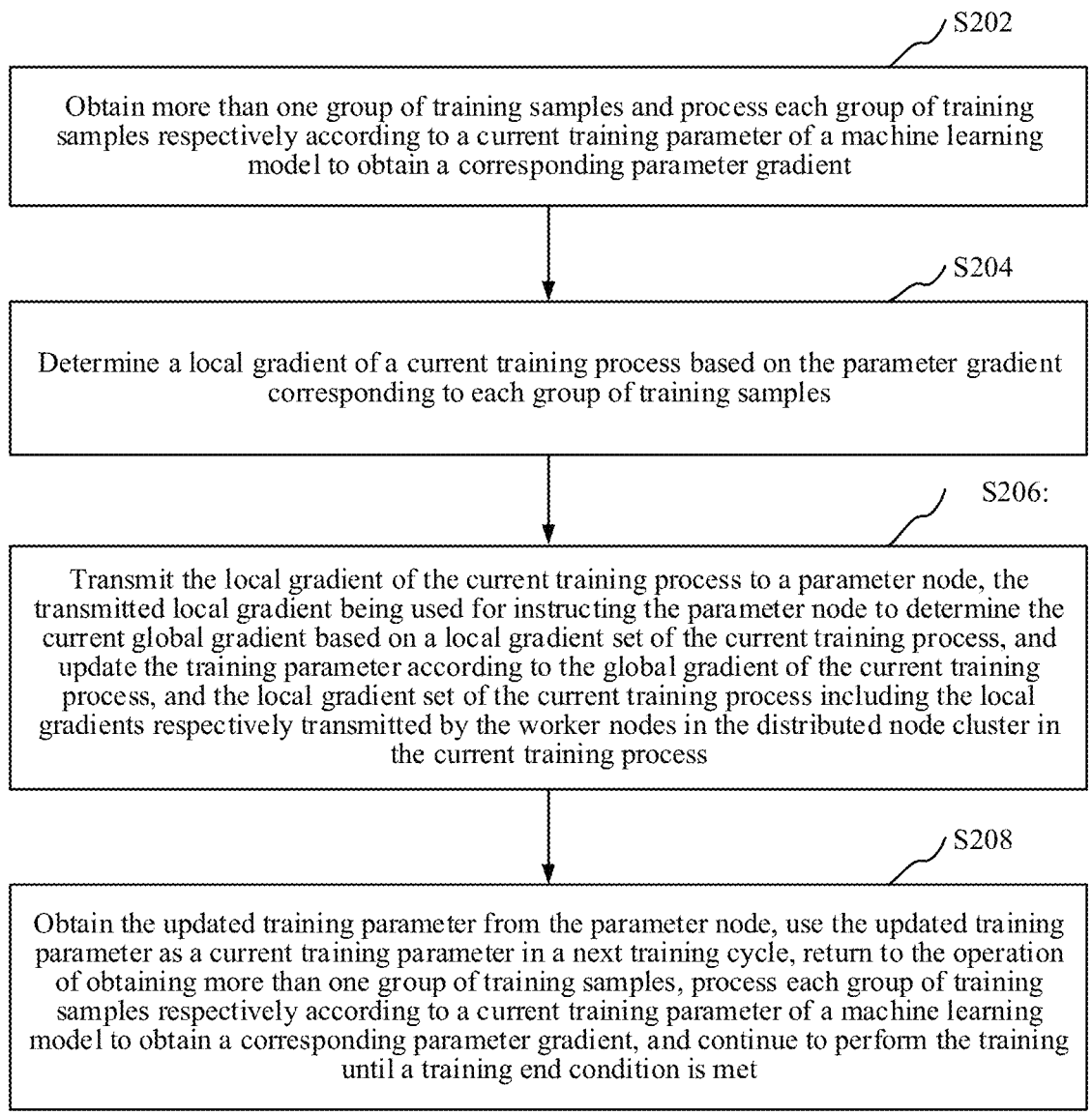
FIG. 2 is a schematic flowchart of a method for distributed training of a machine learning model according to some embodiments.

In an embodiment, as shown in FIG. 2, a schematic flowchart of a method for distributed training of a machine learning model is provided. For example, the method is applied to a worker node in a distributed node cluster (for example, any one of the worker nodes in FIG. 1). The method for distributed training of a machine learning model includes the following operations:

Operation S202. Obtain more than one group of training samples and process each group of training samples respectively according to a current training parameter of a machine learning model to obtain a corresponding parameter gradient.

The training samples are to-be-processed data assigned to the worker node. In the process of performing machine learning model training, the worker node may process data in the training sample to obtain a corresponding parameter gradient. The number of samples in the training sample may be one or more. In common application scenarios, in order to improve the processing efficiency of the device, a batch of training samples is often processed at the same time through the machine learning model. When a training sample includes more than one sample, the number of samples may specifically be a number raised to the $n^{th}$ power of 2, for example, the number of samples included in the training sample is 1024 or 512. It can be understood that, in different machine learning model training scenarios, the data amount of the samples in the training sample may be the same or different, which is not particularly limited herein.

Each worker node in the distributed node cluster independently has an identically structured machine learning model. When performing machine learning model training, each worker node sequentially or simultaneously reads more than one group of training samples from a training subset assigned thereto, and processes each group of training samples based on the current training parameter respectively to obtain the parameter gradients corresponding to the corresponding training samples. The current training parameter is a parameter corresponding to the current training of the machine learning model. The value of the training parameter varies in different machine learning model training processes.

A training cycle mentioned in the embodiments is a corresponding cycle where a worker node processes more than one group of training samples to obtain corresponding local gradients. In each training cycle, the training parameter of the machine learning model remains unchanged. The training parameter of the machine learning model will also be continuously updated with training cycles.

The parameter gradient is used for representing a direction of change of a model parameter. In the model optimization of deep learning, a gradient descent method may be used to calculate the gradient, and a minimum loss value may be found according to the gradient and used to adjust the parameters of the model, thereby speeding up the convergence of the model. It can be understood that there are many methods for separately training the to-be-trained model with training samples in each worker node to calculate the parameter gradient, such as stochastic gradient descent, batch gradient descent, or mini-batch gradient descent, etc. The algorithm used by the training model to calculate the parameter gradient is not limited herein.

The distributed node cluster may include a plurality of worker nodes, and different worker nodes first obtain their corresponding training samples before executing the training of the machine learning model, and respectively execute the training of the machine learning model according to the obtained training samples. It can be understood that data contents in the training samples corresponding to different worker nodes are different, and data volumes corresponding to the training samples in different worker nodes may be the same or different, which is not limited in the embodiments herein. In addition, one worker node may correspond to a plurality of groups of training samples, and the worker node may perform one time of machine learning model training according to each group of training samples.

For each worker node, the worker node obtains more than one group of training samples, and inputs the more than one group of training samples into the machine learning model respectively. The machine learning model respectively processes the training samples according to the current training parameter to obtain a parameter gradient corresponding to each group of training samples. Moreover, the parameter gradients corresponding to different groups of training samples may be the same or different.

In an embodiment, the worker node first obtains a group of training samples, and calculates a parameter gradient corresponding to the group of training samples according to the current training parameter in the machine learning model; then the worker node obtains another group of training samples, and calculates a parameter gradient corresponding to the another group of training samples according to the current training parameter in the machine learning model; the operation of calculating the parameter gradients according to the current training parameter is stopped when a data volume of the calculated parameter gradients reaches a preset number. Different worker nodes may synchronously execute the operation training of the machine learning model based on the same training parameter.

Operation S204. Determine a local gradient of a current training process based on the parameter gradient corresponding to each group of training samples.

The local gradient is a gradient value obtained by a worker node in the distributed node cluster by processing a preset number of groups of training samples during the current model training process. It can be understood that the local gradients corresponding to different worker nodes may be different; and local gradients obtained by performing the training of the machine learning model based on different training parameters may also be different. The local gradients determined by different worker nodes in the distributed node cluster based on the same training parameter may be different or the same.

Each worker node may use the parameter gradients corresponding to the groups of training samples as local gradients, and transmit same to the parameter node together for a next operation of calculation. Alternatively, the worker node may sum the parameter gradients corresponding to the groups of training samples to obtain a total parameter gradient, and then use the total parameter gradient as the local gradient. Alternatively, the worker node may calculate an average value of the parameter gradients corresponding to the groups of training samples, and use the average value as the local gradient. This is not limited in the embodiments.

Operation S206. Transmit the local gradient of the current training process to a parameter node, the transmitted local gradient being used for instructing the parameter node to determine a global gradient of the current training process based on a local gradient set of the current training process, and update the training parameter according to the global gradient of the current training process, and the local gradient set of the current training process including the local gradients respectively transmitted by the worker nodes in the distributed node cluster in the current training process.

The global gradient is determined by the parameter node in the distributed node cluster. The global gradient is determined by the parameter node according to the obtained local gradients of all the worker nodes in the current training cycle, that is, the global gradient is a value corresponding to the training of the machine learning model in a training cycle.

In each worker node, after obtaining the parameter gradient corresponding to each group of training samples, the worker node may also transmit the corresponding local gradient to the parameter node. For example, each worker node sends the local gradient corresponding to itself in the current training cycle to the parameter node; or after each worker node calculates the corresponding local gradient, each worker node sends an instruction to the parameter node, so that the parameter node may actively pull the local gradients from the worker nodes to obtain a local gradient set, and so on, which is not limited herein. In addition, when the parameter node obtains the local gradients of all worker nodes in the current training cycle, that is, obtains the local gradient set of the current training process, the parameter node determines the global gradient according to the local gradients of the worker nodes, and executes updating of the current training parameter according to the global gradient. It can be understood that algorithms for executes updating of the current training parameter according to the global gradient may include, but are not limited to, a gradient descent algorithm.

In an embodiment, in the distributed node cluster, the number of worker nodes is more than one, and the number of parameter nodes may be one or more, which is not limited herein. In an embodiment, when the number of parameter nodes in the distributed node cluster is one, the worker nodes transmit the parameter gradients of the groups of training samples to the same parameter node. When the number of parameter nodes in the distributed node cluster is more than one, the worker nodes may transmit the parameter gradients of the groups of training samples to different parameter nodes. For example, the worker nodes may transmit parameter gradients corresponding to different training parameters to different parameter nodes by polling, until the parameter gradients of all the training parameters have been transmitted to the parameter nodes.

Specifically, the training parameter in the machine learning model may include more than one model parameter, and the local gradient may include gradient values corresponding to each model parameter. In an embodiment, when the distributed node cluster includes a plurality of parameter nodes and the training parameters includes more than one model parameter, the worker node transmits gradient values corresponding to the model parameters to the parameter nodes according to the number of parameter nodes by polling. The worker node may transmit the gradient values of the model parameters to each parameter node by polling according to a polling algorithm. For example, the worker node sequentially reads a gradient value corresponding to a model parameter from the local gradient, and transmits the gradient value to each parameter node by polling, until all local gradients have been transmitted to the parameter nodes. Suppose there are 10 model parameters in total and there are 5 parameter nodes. According to the polling algorithm, gradient values of model parameter 1 and model parameter 6 may be transmitted to parameter node 1, gradient values of model parameter 2 and model parameter 7 may be transmitted to parameter node 2, gradient values of model parameter 3 and model parameter 8 may be transmitted to parameter node 3, gradient values of model parameter 4 and model parameter 9 may be transmitted to parameter node 4, and gradient values of model parameter 5 and model parameter 10 may be transmitted to parameter node 5. Each parameter node updates the corresponding model parameters according to the obtained gradient values.

Operation S208. Obtain the updated training parameter from the parameter node, use the updated training parameter as a current training parameter in a next training cycle, return to the operation of obtaining more than one group of training samples and processing each group of training samples respectively according to a current training parameter of a machine learning model to obtain a corresponding parameter gradient, and continue to perform the training until a training end condition is met.

Specifically, after the parameter node updates the training parameters according to the global gradient to obtain new training parameters, each worker node in the distributed node cluster obtains the updated training parameters from the parameter node respectively, and uses the updated training parameters as the current training parameters to continue to perform training of the machine learning model, until a training condition is met.

In an embodiment, each worker node in the distributed node cluster may actively pull the updated training parameters from the parameter node respectively, and continue to perform the training of the machine learning model according to the updated training parameters. Alternatively, the parameter node may transmit the updated training parameters to each worker node, so that each worker node continues to perform training of the machine learning model according to the updated training parameters. This is not limited thereto.

In an embodiment, the obtaining the updated training parameter from the parameter node, and performing model training on the machine learning model based on the updated training parameter until a training end condition is met may include: obtaining the updated training parameter from the parameter node, use the updated training parameter as a current training parameter in a next training cycle, returning to the operation S202 of obtaining more than one group of training samples and processing each group of training samples respectively according to a current training parameter of a machine learning model to obtain a corresponding parameter gradient, and continuing to perform the training until a training stop condition is met.

The training stop condition is a condition for stopping the model training, and may specifically be that the processing of all training samples has be completed in each worker node, or training precision of the machine learning model reaches a preset precision, or a preset number of iterations is reached, and so on. In an embodiment, the worker node obtains the updated training parameter from the parameter node, and uses the updated training parameter as the current training parameter in the next training cycle, and then continues to obtain a preset number of groups of training samples from the training subset to start a next training cycle. In this way, iterative training is performed continuously, that is, operations S202 to S208 are repeatedly performed until the training end condition is met, so as to obtain the trained machine learning model.

Figure 3:
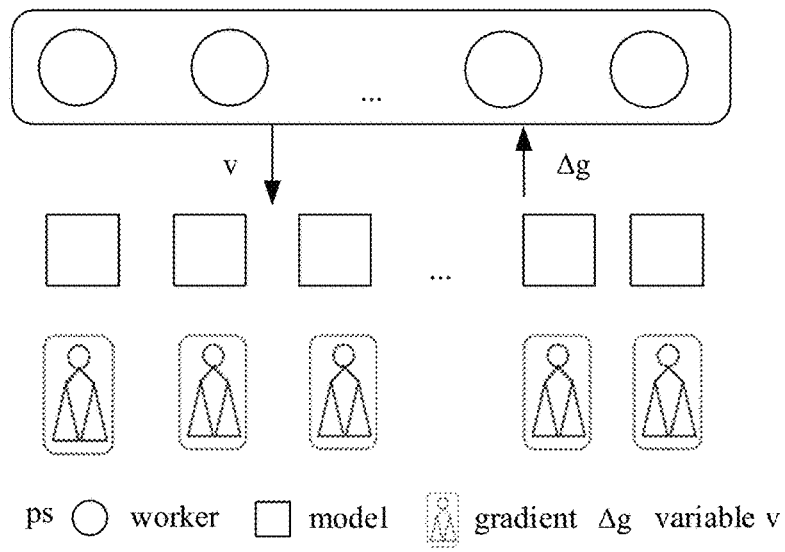
FIG. 3 is a schematic diagram showing data transmission between different nodes in a mode for synchronous distributed training of a machine learning model according to some embodiments.
Figure 4:
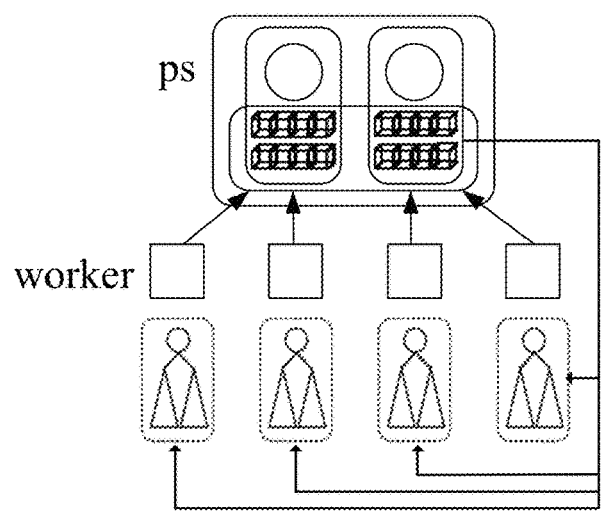
FIG. 4 is a schematic diagram showing data flow directions between different nodes based on the mode for synchronous distributed training of a machine learning model according to some embodiments.

FIG. 3 is a schematic diagram showing data transmission between different nodes in a mode for synchronous distributed training of a machine learning model according to some embodiments. FIG. 4 is a schematic diagram showing data flow directions between different nodes based on the mode for synchronous distributed training of a machine learning model according to some embodiments. As shown in FIG. 3 and FIG. 4, in a conventional synchronous distributed training process, a worker node trains a machine learning model once according to a group of training samples to obtain a parameter gradient Δg, and transmits the parameter gradient Δg corresponding to this model training to a parameter node (ps node). The parameter node updates a current training parameter v (variable) according to the obtained parameter gradient, and after the updating is completed, the worker node copies the updated training parameter v from the parameter node, and starts a model training process using a next group of training samples according to the updated training parameter v. It can be seen that in the conventional scheme, each time the worker node performs model training using one group of training samples, the worker node communicates with the parameter node once, and the parameter node performs updating of the training parameter once according to the parameter gradient of each training sample, and communicates with the worker node once. As a result, the model training process involves frequent interactions between different nodes, and with the increase of the number of worker nodes, the traffic at a network adapter of ps also increases considerably, resulting in a low scalability of the cluster.

The worker node may perform iterative training in the machine learning model for a plurality of times according to a plurality of groups of training samples to obtain the parameter gradient Δg, and when the number of parameter gradients Δg obtained by the worker node reaches a preset value, the worker node transmits the parameter gradients Δg to the parameter node (ps node). After obtaining the parameter gradients transmitted by all the worker nodes, the parameter node averages all the parameter gradients to obtain an average parameter gradient value, uses the average parameter gradient value as the global gradient, and updates the current training parameter v (variable) according to the global gradient. After the updating is completed, the parameter node notifies all the worker nodes, so that each worker node copies the updated training parameter v from the parameter node, and starts a new round of iterative model training process according to the updated training parameter v. In an example embodiment, the worker node communicates with the parameter node once only after performing a plurality of times of iterative model training based on a plurality of groups of training samples with local resources, which greatly reduces the number of communications between different nodes. In addition, the worker node uses the same training parameter in the process of performing model training based on a plurality of groups of training samples, so the accuracy of model training is also improved.

After obtaining the parameter gradients transmitted by all the worker nodes, the parameter node performs the updating of the training parameter once and communicates with the worker node once, which greatly reduces the number of communications between the parameter node and the worker nodes, thereby greatly improving the efficiency of model training.

Figure 5:
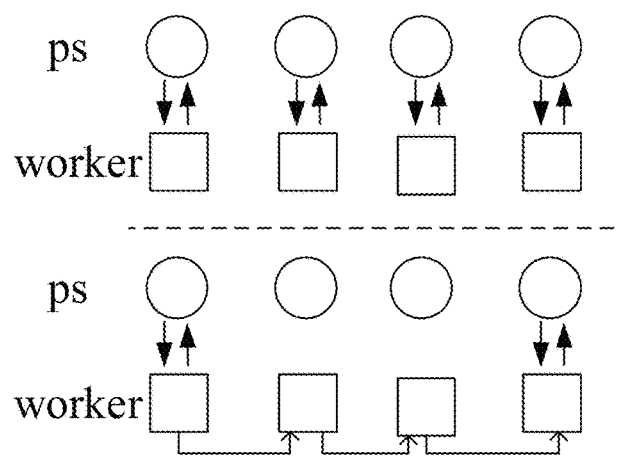
FIG. 5 is a schematic diagram showing interaction of a worker node with a parameter node after performing one and a plurality of model training according to some embodiments.

FIG. 5 is a schematic diagram showing interaction of a worker node with a parameter node after performing one and a plurality of model training according to some embodiments. Specifically, an upper part of the diagram in FIG. 5 illustrates that the worker node communicates with the ps node once after each time of model training. A lower part of the diagram in FIG. 5 illustrates that the worker node communicates with the ps node once after a plurality of times of model training. The worker node is the above-mentioned worker node, and the ps node is the above-mentioned parameter node.

In an example embodiment such as an advertising application scenario, distributed training may be used to train advertisement click-through rate and advertisement conversion rate models. Specifically, in a trained model, inputted training samples may be composed of two types of features, such as an attribute feature of an advertisement and an attribute feature of a user, and the output of the model is a probability value that the user clicks on the advertisement.

In the above method for distributed training of a machine learning model, in each training cycle, a worker node in a distributed node cluster obtains more than one group of training samples, and processes each group of training samples respectively according to a current training parameter of a machine learning model to obtain a parameter gradient corresponding to each group of training samples. In the process of training the machine learning model based on a plurality of groups of training samples in the worker node, the training parameter is not updated, but instead, the same training parameter is used to calculate the parameter gradients, which improves the accuracy of calculation of the parameter gradients. In addition, the worker node further stores the parameter gradient corresponding to each group of training samples until the training of all groups of training samples is completed. The worker node determines the local gradient of the current training process according to the parameter gradient corresponding to each group of training samples, and transmits the local gradient of the current training process to the parameter node. Therefore, only after the worker node performs a plurality of model training iterations with local resources, will the worker node communicate and interact with the parameter node once, thereby reducing the frequency of communication between different nodes. In addition, in the current training cycle, the parameter node may determine the global gradient of the current training process based on the local gradients respectively transmitted by the worker nodes in the distributed node cluster in the current training process, and update the training parameter according to the global gradient of the current training process. The worker node may obtain the updated training parameter from the parameter node, and continue to perform model training corresponding to the next training cycle based on the updated training parameter, until the training end condition is met. In the process of distributed training of the machine learning model, only after the parameter gradients corresponding to a plurality of groups of training samples are obtained in each worker node, will the parameter gradients be transmitted to the parameter node, which reduces the number of interactions between the worker nodes and the parameter node, and effectively reduces the incoming and outgoing traffic during the training of the machine learning model, thereby improving the efficiency of training the machine learning model.

In an embodiment, the obtaining more than one group of training samples may include: obtaining a training subset divided from a training set and correspondingly allocated to the worker node, where training subsets respectively correspondingly allocated to the worker nodes in the distributed node cluster constitute the training set; and obtaining a preset number of groups of training samples from the training subset, the preset number being greater than one.

The training set is a data set used to train the machine learning model. It can be understood that, in general, a larger data volume of the training set indicates a higher precision of the machine learning model obtained by training. The training subset is a data subset divided from the training set, and different training subsets are assigned to different worker nodes in the distributed node cluster, so that each worker node executes distributed training of the machine learning model according to the assigned training subset. Additionally, in example embodiments, the computer device may divide data in the training set into different training subsets uniformly or non-uniformly, and assign the training subsets of the same or different sizes to different worker nodes.

The training subset is obtained by sharding the training set, and the training subset includes more than one data file. Specifically, the computer device may sequentially read a data file from the training set, and assign the data file to each worker node by polling, until all the training data has been assigned to the worker nodes. As such, the sharding of the training set and the assignment of the training set are completed.

The computer device may uniformly divide the training set into a plurality of training subsets, and the number of training subsets is the same as the number of worker nodes in the distributed node cluster, so that the training subsets are uniformly assigned to different worker nodes. Alternatively, the computer device may divide the training set into a plurality of training subsets of different data volumes, and assign the plurality of training subsets of different data volumes to different worker nodes respectively.

For example, if the training set includes 100 data files, and the distributed node cluster includes five worker nodes, the computer device may uniformly divide the training set into five different training subsets, with each training subset including 20 data files. In this case, the uniform division and assignment of the training set is achieved. In another example, if the training set includes 10 data files, and the distributed node cluster includes three worker nodes, the uniform division and assignment of the training set cannot be achieved, and the computer device may, for example, non-uniformly divide the training set at a ratio of 4:3:3 to obtain three training subsets of different data volumes.

Furthermore, the computer device may assign the data in the training set to different worker nodes according to a polling algorithm. For example, there are 10 data files and three worker nodes. In a first round of polling, data files with serial numbers 1, 2, and 3 may be assigned to worker nodes 1, 2, and 3. In a second round of polling, data files with serial numbers 4, 5, and 6 may be assigned to worker nodes 1, 2, and 3. In a third round of polling, data files with serial numbers of 7, 8, and 9 may be assigned to worker nodes 1, 2, and 3. In a last round of polling, a data file with a serial number 10 may be assigned to any one of the worker nodes 1, 2, and 3.

In some embodiments, the method for distributed training of a machine learning model may be applied to, for example, but not limited to, the application environment shown in FIG. 1. As shown in FIG. 1, a computer device includes a plurality of GPUs, and at least one worker node may run on each GPU. For the convenience of description, the above worker nodes are denoted as worker nodes 1 to N, where N is a positive integer greater than 1. During training, the computer device obtains the training set, and divides the training set into a plurality of training subsets, where the training subsets each includes a plurality of groups of training samples for training the machine learning model; and then respectively assigns the plurality of training subsets to worker nodes 1 to N, so that worker nodes 1 to N train the same machine learning model in parallel based on different training samples.

In the above embodiment, by dividing the training set into a plurality of training subsets and using a plurality of worker nodes in the distributed node cluster to perform the training of the machine learning model using different training subsets in parallel, the load on a single computer is reduced, making it possible to train with a training set of a large data volume. As different worker nodes perform model training in parallel, the efficiency of model training is also improved. The use of a training set of a large data volume to perform training of the machine learning model also improves the precision of model training.

In an embodiment, the obtaining a preset number of groups of training samples from the training subset includes: sequentially reading a group of training samples to be processed in a current training cycle from the training subset. The processing each group of training samples respectively according to a current training parameter of a machine learning model to obtain a corresponding parameter gradient includes: in the current training cycle, for a group of training samples read each time, respectively processing the read group of training samples according to the current training parameter of the machine learning model to obtain the corresponding parameter gradient; and in response to a number of obtained parameter gradients reaching the preset number, stopping reading of training samples in the current training cycle.

The training samples are sample data to be inputted and processed by the machine learning model during the training process. A training subset may include a plurality of groups of training samples. One group of training samples may be individually used to perform processing of the machine learning model once, and a parameter gradient is determined based on an output of the machine learning model.

Specifically, each worker node sequentially obtains a preset number of groups of training samples from the training subset, processes each group of training samples respectively according to the current training parameter of the machine learning model to obtain a corresponding parameter gradient, and when the number of parameter gradients reaches a preset iteration number, stops the operation of extracting training samples from the training subset and performing training of the machine learning model in the current training cycle.

In an embodiment, each worker node in the distributed node cluster may sequentially extract a group of training samples to be processed in the current training cycle from the corresponding training subset, until the preset number of groups of training samples have been extracted. In addition, in the current training cycle, for a group of training samples read each time, the worker node may respectively process the read group of training samples according to the current training parameters of the machine learning model to obtain a parameter gradient corresponding to the group of training samples. Then the worker node continues to extract another group of training samples from the training subset, performs the operation of calculating the parameter gradients, and in response to the number of obtained parameter gradients reaching the preset number, stops reading of training samples in the current training cycle.

In an embodiment, the worker node reads a group of training samples from the training subset, performs training of the machine learning model using the training samples according to the current training parameter to obtain the parameter gradient corresponding to this group of training samples, and stores the parameter gradient in a gradient accumulator. Then the worker node continues to read another group of training samples from the training subset, performs training of the machine learning model using the another group of training samples according to the current training parameter to obtain a new parameter gradient, and adds the new parameter gradient to the gradient accumulator. When a number of parameter gradients in the gradient accumulator reaches the preset number, the operation of extracting training samples from the training subset in the current training cycle is stopped.

In the above embodiment, before the number of iterations in the worker node reaches the preset number, the operation of updating the training parameter of the training model in the worker node according to the parameter gradient is not performed, but instead, the parameter gradient obtained in each iteration is stored in the gradient accumulator. In addition, the worker node communicates with the parameter node and executes the operation of updating the training parameter once only when the number of parameter gradients in the gradient accumulator reaches the preset number, which reduces the number of communications between the parameter node and the worker node, thereby improving the efficiency of model training.

In an embodiment, the determining a local gradient of a current training process based on the parameter gradient corresponding to each group of training samples includes: determining a first gradient sum corresponding to the current training cycle according to the parameter gradients respectively corresponding to the more than one group of training samples; calculating a first average gradient according to the first gradient sum and a first number corresponding to the training samples, the first number corresponding to the training samples being a total number of groups of training samples read by a worker node in a training cycle; and using the first average gradient as the local gradient corresponding to the current training cycle.

Specifically, in the process of performing training of the machine learning model using each group of training samples, the worker node obtains a parameter gradient for each group of training samples, and stores the parameter gradient obtained each time in the gradient accumulator. When the worker node obtains N groups of training samples (N being a positive integer greater than 1) and performs N times of training of the machine learning model, the worker node obtains N parameter gradients, and stores the N parameter gradients in the gradient accumulator. When the number of parameter gradients in the gradient accumulator reaches N, a gradient mean of the N parameter gradients is calculated in the gradient accumulator. That is, when obtaining N parameter gradients in the current training cycle, the accumulator may sum the N parameter gradients to obtain a first gradient sum corresponding to the current training cycle, and calculates a first average gradient according to the first gradient sum and the first number corresponding to the training samples. The first average gradient is used as the local gradient corresponding to the current training cycle. The first number corresponding to the training samples refers to the total number of groups of training samples read by a worker node in a training cycle. For example, the first number corresponding to the training samples may be N, i.e., equal to the number of groups of training samples. Further, the worker node sends the local gradients to the parameter node, so that the parameter node performs updating of the current training parameter. It can be understood that the value of N may be adaptively set according to actual application scenarios.

The gradient accumulator is a container configured to receive a certain number of numerical values, and when the number of numerical values received reaches a preset value N, perform an operation of calculating an average value of all the numerical values. Specifically, the gradient accumulator may externally provide two interfaces, take and apply, where take means to store numerical values in the gradient accumulator, and apply means to obtain an average value of the currently stored parameter gradient values from the gradient accumulator. This is not limited to the use of the gradient accumulator to store the parameter gradients and calculate the average parameter gradient.

In the above embodiment, the worker node obtains the local gradient by averaging a plurality of parameter gradients. The worker node transmits only the local gradient to the parameter node, instead of transmitting all the parameter gradients to the parameter node, which reduces the amount of data exchanged in the communication process between different nodes and improves the operating efficiency of the computer.

In an embodiment, when the number of parameter gradients in the gradient accumulator reaches an iteration number, a first average gradient is determined according to the parameter gradients; and the first average gradient is transmitted to the parameter node to instruct the parameter node to determine an updated training parameter for the model according to the first average gradient.

The training parameter in the machine learning model may include more than one model parameter, and the parameter gradient includes gradient values corresponding to each model parameter. The determining a first average gradient according to the parameter gradients includes: determining a plurality of gradient values respectively corresponding to each model parameter based on the parameter gradient corresponding to each group of training samples; for each model parameter in the plurality of model parameters, calculating a total gradient value according to the plurality of gradient values corresponding to the current model parameter; for each model parameter in the plurality of model parameters, determining a first average gradient of the current model parameter according to the total gradient value of the current model parameter and a first number corresponding to the training samples, the first number corresponding to the training samples being a total number of groups of training samples read by a worker node in a training cycle; and using the first average gradient of each model parameter as the local gradient corresponding to the current training cycle.

In an example embodiment, the worker node extracts the gradient values of each model parameter from the parameter gradients, and calculates a total gradient value corresponding to each model parameter according to the gradient values. For each model parameter in the plurality of model parameters, the worker node calculates a model-parameter average gradient value of the current model parameter (that is, the first average gradient above) according to the total gradient value of the current model parameter and the first number corresponding to the training samples, and transmits the model-parameter average gradient value of each model parameter to the parameter node to instruct the parameter node to update the training parameter according to the model-parameter average gradient values.

When the number of parameter nodes is more than one, the worker node transmits the model-parameter average gradient values to the parameter nodes according to the number of parameter nodes by polling. Specifically, the worker node may transmit the model-parameter average gradient values to each parameter node by polling according to a polling algorithm. In an embodiment, the worker node sequentially reads a model-parameter average gradient value corresponding to a model parameter from the first average gradients, and transmits the model-parameter average gradient value to each parameter node by polling, until all first average gradients have been transmitted to the parameter nodes. For example, suppose there are 10 model parameters in total and there are 5 parameter nodes. According to the polling algorithm, first average gradients of model parameter 1 and model parameter 6 may be transmitted to parameter node 1, first average gradients of model parameter 2 and model parameter 7 may be transmitted to parameter node 2, first average gradients of model parameter 3 and model parameter 8 may be transmitted to parameter node 3, first average gradients of model parameter 4 and model parameter 9 may be transmitted to parameter node 4, and first average gradients of model parameter 5 and model parameter 10 may be transmitted to parameter node 5.

Figure 6:
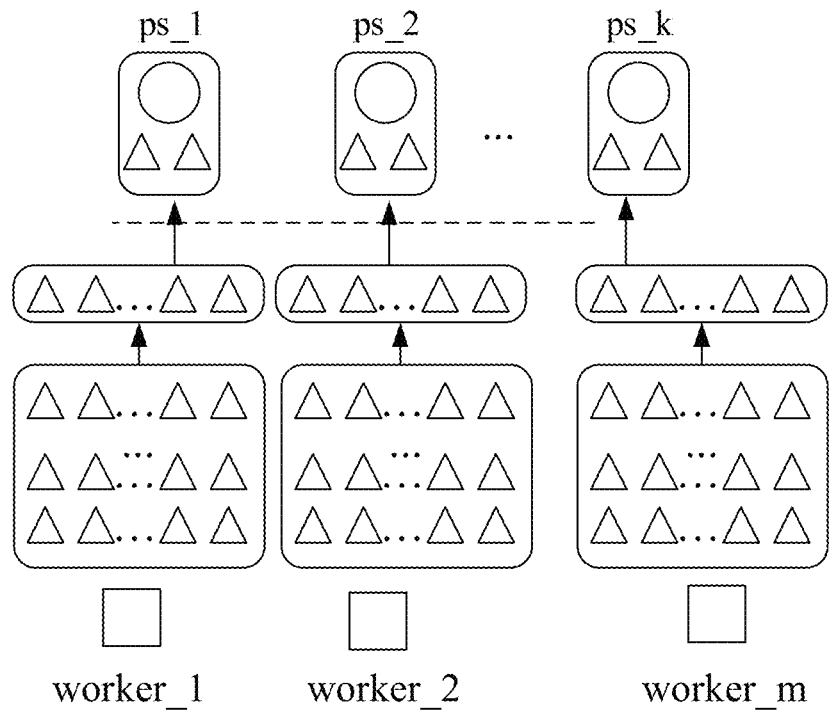
FIG. 6 is a schematic diagram showing data transmission between different nodes based on a mode for asynchronous distributed training of a machine learning model according to some embodiments.

FIG. 6 is a schematic diagram of transmitting a plurality of model parameters in a worker node to a ps node according to an embodiment. In FIG. 6, there are a plurality of worker nodes, namely, worker_1, worker_2, and worker_m, and different worker nodes independently perform model training. Specifically, the worker node sequentially performs N times of iterative training based on the N groups of training samples to obtain parameter gradients of the N groups, and calculates an average for each model parameter in the worker node to obtain a model-parameter average gradient value corresponding to each model parameter. The worker node transmits the model-parameter average gradient values of all the model parameters to different ps nodes, for example, may transmit different model-parameter average gradient values to ps_1, ps_2, and ps_k respectively.

In the above embodiment, in the process of performing training of the machine learning model using each group of training samples, the worker node obtains a parameter gradient, and stores the parameter gradient obtained each time in the gradient accumulator. When the worker node performs N times of training of the machine learning model, the worker node obtains N parameter gradients, and stores the N parameter gradients in the gradient accumulator. When the number of parameter gradients in the gradient accumulator reaches N, the worker node calculates a first average gradient of the N parameter gradients, and transmits the first average gradient to the parameter node, so that the parameter node performs updating of the training parameter. On the basis of ensuring a large number of training sample, the worker node interacts with the parameter node once only after training the model for a plurality of iterations, which reduces the number of interactions between the worker node and the parameter node, thereby improves the efficiency of training the machine learning model.

In an embodiment, the processing each group of training samples respectively according to a current training parameter of a machine learning model to obtain a corresponding parameter gradient includes: performing model processing on each group of training samples according to the current training parameter of the machine learning model, to obtain a prediction result corresponding to each group of training samples; obtaining a reference result corresponding to each group of training samples; determining a target loss value according to the reference result and the prediction result; and determining the parameter gradient corresponding to each group of the training samples according to the target loss value.

The prediction result is a result obtained by the machine learning model by performing data processing on the training samples according to the current training parameter. The reference result is a real result corresponding to the training samples. Different training parameters correspond to different prediction results, so the training parameter may be adjusted according to differences between different training results and the real result, so as to minimize the difference between the prediction result corresponding to the training parameter and the real result.

In an embodiment, for each training sample, the training sample is processed using the current training parameter in the machine learning model to obtain a prediction result corresponding to each sample in the training sample, and a sum of the prediction results of all the samples is calculated to obtain the target loss value corresponding to the training sample. The parameter gradient corresponding to each group of the training samples is determined according to the target loss value.

In the above embodiment, the target loss value is determined according to the prediction result and the reference result, the parameter gradient is determined according to the target loss value, and the training parameter is updated according to the obtained parameter gradient, thereby improving the efficiency and accuracy of updating the training parameter.

In an embodiment, the obtaining the updated training parameter from the parameter node includes: polling a synchronization queue after transmitting the local gradient of the current training process to the parameter node; in a case that a parameter token is accessed from the synchronization queue, obtaining the updated training parameter from the parameter node based on the parameter token, the parameter token being stored in the synchronization queue by a main worker node in the distributed node cluster after receiving an instruction indicating that the updating of the training parameter is complete from the parameter node.

The synchronization queue is a cache queue for storing parameter tokens. The parameter token is a credential for obtaining the updated training parameter, and may be specifically used to represent permission information. For example, the parameter token may be an identification code, etc., which is not limited herein.

Specifically, the worker nodes in the distributed node cluster may also be divided into a main worker node and non-main worker nodes according to functions. Specifically, the worker nodes may be numbered in advance. For example, the worker nodes may be numbered respectively as worker node 0, worker node 1, worker node 2, worker node 3, etc. Worker node 0 is used as the main worker node, and other worker nodes are used as non-main worker nodes. Both the main worker node and the non-main worker nodes may perform the training of the machine learning model. Further, the main worker node may further write a preset number of parameter tokens into the synchronization queue when receiving an instruction indicating that the updating of the training parameter is complete from the parameter node. The preset number may be the number of worker nodes (main worker nodes and non-main worker nodes) in the distributed node cluster, or the preset number may also be the number of non-worker nodes in the distributed node cluster, which is not limited herein.

Further, after the non-main worker node transmits the local gradient to the parameter node, the non-main worker node is further configured to poll the synchronization queue. When accessing a parameter token from the synchronization queue, the non-main worker node obtains the updated training parameter from the parameter node based on the parameter token, and continues to perform a new round of model training using the updated training parameter as the current training parameter.

In an embodiment, for one time of machine learning model training, each worker node may transmit the first average gradient to the corresponding parameter node, and store the first average gradient in a parameter accumulator in the parameter node. When the number of first average gradients received in the parameter accumulator is consistent with the number of worker nodes, the parameter node transmits an instruction indicating that the updating of the training parameter update has been completed to the main worker node. The main worker node averages all the first average gradients stored in the parameter accumulator again to obtain a second average gradient, calculates a new training parameter according to the second average gradient, and uses the new training parameter as a global variable. When the parameter node has completed the updating of the training parameter, the main worker node writes n−1 tokens into the synchronization queue (n−1 being the number of non-main worker nodes). After transmitting the first average gradient to the parameter node, the non-main worker node polls the synchronization queue. When the non-main worker node successfully accesses a token from the synchronization queue, it means that the updating of the training parameter update has been completed. After fetching a token from the synchronization queue, the non-main worker node pulls the updated global variable from the parameter node according to the fetched token, updates a local variable (training parameter) with the global variable, and starts a new round of N iterations.

In the above embodiment, according to the different tasks performed by the worker nodes, the worker nodes are divided into main worker nodes and non-main worker nodes. The main worker node exchanges information with the parameter node, providing an information bridge connecting the worker node and the parameter node, thereby improving the efficiency of information exchange. In addition, because the updated training parameter may further be extracted from the synchronization queue by using the parameter token, the security of the information exchange process is further improved.

In an embodiment, the machine learning model includes a click-through rate prediction model, and the method for distributed training of a machine learning model further includes: an operation of predicting whether a target user clicks on target promotion information. This operation specifically includes: obtaining a trained click-through rate prediction model; obtaining to-be-processed data related to the target user and the target promotion information; and processing the to-be-processed data by using the trained click-through rate prediction model and outputting a predicted click-through rate, the predicted click-through rate being used for representing a probability that the target user clicks on the target promotion information.

The target user is a user to be predicted, and the to-be-processed data related to the target user may be user attribute data or user behavior data of the target user. The to-be-processed data related to the target promotion information may be certain advertisement information or commodity information. The predicted click-through rate may specifically be a probability value, which is used for representing a probability that the target user clicks on the target promotion information. The predicted click-through rate may specifically be a binary probability. For example, when the target user is predicted to click on the target promotion information, the corresponding probability value is 1; when the target user is predicted not to click on the target promotion information, the corresponding probability value is 0. Alternatively, the predicted click-through rate may specifically be any probability value ranging from 0 to 1. A larger probability value indicates a higher possibility that the target user clicks on the target promotion information.

The click-through rate prediction model is configured to predict a click-through rate of the target user on target promotion information. Specifically, the computer device may obtain the to-be-processed data related to the target user and the to-be-processed data related to the target promotion information in advance, and then input at least one of the to-be-processed data related to the target user or the to-be-processed data related to the target promotion information into a pre-trained click-through rate prediction model. The inputted to-be-processed data is processed according to a model parameter pre-trained in the click-through rate prediction model to obtain a predicted click-through rate that represents the probability that the target user clicks on the target promotion information.

In the above embodiment, when the machine learning model is a click-through rate prediction model, the trained click-through rate prediction model may further be used to predict the probability that the target user clicks on the target promotion information. Since the click-through rate prediction model is obtained through training with a large number of training sets, the prediction precision of the model is very high, so the accuracy of the probability that the target user clicks on the target promotion information predicted by the click-through rate prediction model is also very high.

In an embodiment, the obtaining to-be-processed data related to a target user and target promotion information includes: obtaining user attribute data and user behavior data corresponding to the target user; obtaining a promotion content and promotion attribute data corresponding to the target promotion information; determining an input feature according to at least one of the user attribute data, the user behavior data, the promotion content, or the promotion attribute data; and processing the to-be-processed data by using the trained click-through rate prediction model and outputting a predicted click-through rate, including: input the input feature into the trained click-through rate prediction model, so that the trained click-through rate prediction model processes the input feature and outputs the predicted click-through rate.

The input feature is feature data obtained by performing feature extraction on the to-be-processed data. The computer device may obtain the user attribute data and the user behavior data corresponding to the target user, and obtain the promotion content and the promotion attribute data corresponding to the target promotion information. The user attribute data is attribute data related to the target user, and may specifically be at least one of the user's name, gender, or age, or city where the user is located. The user behavior data is data related to network behavior of the target user, and may specifically include history click behavior of the target user, etc. The promotion content corresponding to the target promotion information may specifically be an advertisement title or advertisement content. The promotion attribute data may include data such as a topic, type, or source platform of the target promotion information.

The computer device may convert the user attribute data, the user behavior data, the promotion content, and the promotion attribute data into corresponding feature vectors according to a preset coding rule. Then, the computer device splices based on the feature vector corresponding to at least one of the user attribute data, the user behavior data, the promotion content, or the promotion attribute data, to obtain the input feature. The computer device may then input the input feature into the trained click-through rate prediction model, so that the trained click-through rate prediction model processes the input feature and outputs the predicted click-through rate. It can be understood that the predicted click-through rate may be used to estimate an advertisement conversion rate. For example, for a certain target object, whether the target object will click the target advertisement, or the probability that the target object clicks the target advertisement, or whether the target object will place an order or make other behaviors, etc. is estimated.

In an embodiment, a user's operation data on a network may be recorded in the form of exposure log records, and the exposure log records and the user's click operation on the target promotion information are used as training samples to train the machine learning model. It can be understood that the training sample may be an exposure log record, and the exposure log record includes an advertisement source material, an advertisement ID, an advertisement title, etc. Further, the exposure log record may further include the user's personal characteristic information (information authorized by the user to be disclosed online), etc.

When the click-through rate prediction model needs to be trained, a large number of training samples may be obtained, where the training samples are determined by operation data of sample users on the network in the form of exposure log records and click operations of the sample users on the sample promotion information. The training sample further includes to-be-processed data related to the sample users and sample promotion information. The to-be-processed data in the training sample includes user attribute data and user behavior data corresponding to the sample users, as well as a promotion content and promotion attribute data corresponding to the sample promotion information. The computer device determines the input feature corresponding to the corresponding training sample according to at least one of the user attribute data, the user behavior data, the promotion content, or the promotion attribute data in the training sample. Then the computer device inputs the input feature to the trained click-through rate prediction model, so that the click-through rate prediction model processes the input feature. The model parameter is adjusted according to the processing result, so as to obtain a well-trained click-through rate prediction model. In the above embodiment, when the click-through rate prediction model is used to predict the probability that the target user clicks on the target promotion information, data processing is performed on the input to-be-processed data to obtain an input feature, and then the click-through rate prediction model is used to process the input feature to obtain a predicted click-through rate. Since the output feature is feature data extracted from the to-be-processed data, the input feature not only represents the to-be-processed data, but also has a smaller data volume than the to-be-processed data, thereby improving the efficiency of the click-through rate prediction model in predicting the probability that the target user clicks on the target promotion information.

Figure 7:
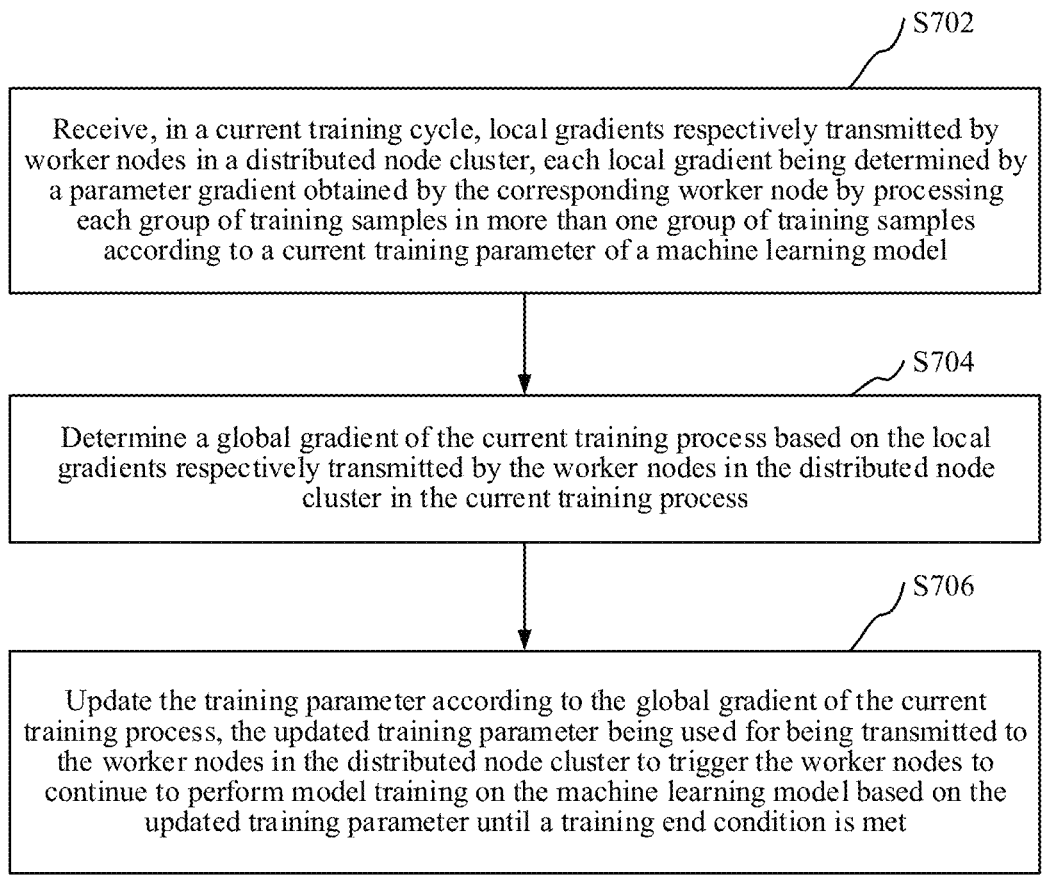
FIG. 7 is a schematic flowchart of a method for distributed training of a machine learning model according to some embodiments.

In an embodiment, as shown in FIG. 7, FIG. 7 is a schematic flowchart of a method for distributed training of a machine learning model according to an embodiment. For example, the method is applied to a parameter node in a distributed node cluster. Specifically, the method includes the following operations.

Operation S702. Receive, in a current training cycle, local gradients respectively transmitted by worker nodes in a distributed node cluster. It can be readily understood that the worker node may process each group of training samples in more than one group of training samples according to the current training parameters of the machine learning model to obtain a parameter gradient corresponding to each group of training samples, and determine a corresponding local gradient according to the parameter gradient.

The local gradient is a gradient value obtained by a worker node in the distributed node cluster by processing a preset number of groups of training samples during the current model training process. It can be understood that the local gradient may be an average value of the parameter gradients of the plurality of groups of training samples, or the local gradient may be a sum of the parameter gradients of the plurality of groups of training samples, or the local gradient may be the parameter gradients of the plurality of groups of training samples, which is not limited herein.

For details on how each worker node calculates the parameter gradient and determines the local gradient according to the parameter gradient, reference may be made to the relevant descriptions of operations S202 to S206 in the foregoing embodiments.

Operation S704. Determine a global gradient of the current training process based on local gradients respectively transmitted by worker nodes in the distributed node cluster in the current training process.

The parameter node receives the local gradient obtained by each worker node in the distributed node cluster in the current training cycle, and determines the global gradient in the current training cycle according to the local gradients transmitted by all the worker nodes. The global gradient may be a sum of the local gradients of all the worker nodes, or may be an average value of the local gradients of all the worker nodes, which is not limited herein.

Operation S706. Update the training parameter according to the global gradient of the current training process, the updated training parameter being used for being transmitted to the worker nodes in the distributed node cluster to trigger the worker nodes to continue to perform model training on the machine learning model based on the updated training parameter until a training end condition is met.

The global gradient is determined according to the local gradients transmitted by all the worker nodes, and the local gradient is determined by the plurality of parameter gradients obtained by the worker nodes by performing model training on a plurality of groups of training samples respectively. It can be understood that if the number of worker nodes is n and the number of times of iterative training that each worker node performs before transmitting the local gradient is N, the number of training samples corresponding to the calculated global gradient is n*N.

Specifically, the parameter node receives the local gradients transmitted by the worker nodes, determines the global gradient according to the local gradients, and determines the updated training parameter according to the global gradient, so as to instruct the worker nodes to continue to perform a next round of model training according to the updated training parameter. In the process of performing machine learning model training in the worker nodes, first, the worker nodes iteratively process N groups of training samples to obtain N parameter gradients, and then transmit a local gradient corresponding to the N parameter gradients to the parameter node. The parameter node determines the global gradient according to the local gradient only after receiving the local gradients transmitted by all the worker nodes.

For details on how the worker nodes continue to perform model training on the machine learning model based on the updated training parameter, reference may be made to the relevant description of operation S208 in the foregoing embodiments.

In the method for distributed training of a machine learning model, in the current training cycle, a parameter node in a distributed node cluster receives local gradients respectively transmitted by worker nodes in the distributed node cluster. Each local gradient is determined by a parameter gradient obtained by the corresponding worker node by processing each group of training samples in more than one group of training samples according to a current training parameter of a machine learning model. In the current training cycle, the same training parameter is used to perform model training based on a plurality of groups of training samples, which improves the accuracy of calculation of the parameter gradients. In addition, each data interaction process between the worker node and the parameter node includes parameter gradient values corresponding to a plurality of groups of training samples, which also reduces the number of interactions between different nodes, thereby improving the efficiency of model training. The parameter node determines a global gradient of the current training process based on the local gradients respectively transmitted by the worker nodes in the distributed node cluster in the current training process. In this way, the parameter node performs the global gradient calculation process once only after receiving the local gradients transmitted by all the worker nodes, which reduces the calculation frequency of the parameter node. Then the parameter node updates the training parameter according to the global gradient of the current training process, the updated training parameter being used for being transmitted to the worker nodes in the distributed node cluster to trigger the worker nodes to continue to perform model training on the machine learning model based on the updated training parameter until a training end condition is met. In this way, the worker node may perform a plurality of times of model iteration training with local resources as much as possible, and the parameter node performs the operations of determining the global gradient and updating the training parameter only after receiving the local gradients transmitted by all the worker nodes. This reduces the number of communication interactions between the worker nodes and the parameter node, and effectively reduces the incoming and outgoing traffic of the machines, thereby improving the efficiency of training the machine learning model.

In an embodiment, the determining a global gradient of the current training process based on the local gradients respectively transmitted by the worker nodes in the distributed node cluster in the current training process includes: determining a second gradient sum corresponding to the current training cycle according to the local gradients respectively corresponding to the worker nodes in the distributed node cluster in the current training cycle; calculating a second average gradient according to the second gradient sum and a second number corresponding to the worker nodes; and using the second average gradient as the global gradient corresponding to the current training cycle.

Specifically, in the current training cycle, the parameter node stores the local gradients transmitted by the worker nodes in the distributed node cluster to a parameter accumulator. When the number of local gradients in the parameter accumulator reaches the number of worker nodes, the parameter node determines the second gradient sum in according to the sum of all the local gradients, and calculates the second average gradient according to the second gradient sum and the second number corresponding to the worker nodes. The second average gradient is used as the global gradient corresponding to the current training cycle.

In the above embodiment, each time the parameter node receives a local gradient transmitted by a worker node, the parameter node performs a summation operation in the parameter accumulator. After the local gradients transmitted by all the worker nodes have been received, the parameter node calculates the global gradient, and performs the updating of the training parameter once according to the global gradient. Therefore, the number of times of updating the training parameter and the number of communications between different nodes are reduced, computer resources are saved, and the efficiency of model training is improved.

In an embodiment, the updating the training parameter according to the global gradient of the current training process includes: obtaining the current training parameter and a model learning rate in the current training cycle; and updating the current training parameter according to the model learning rate and the global gradient of the current training process, to obtain an updated training parameter.

The learning rate is a fixed learning rate set in the machine learning model. It can be understood that the value of the learning rate may be dynamically adjusted in the specific machine learning iteration process. For example, the value of the learning rate is set to 0.001 for the first 10,000 iterations, and set to 0.0001 for the next 10,000 iterations, which is not limited herein.

Specifically, the training parameter may be updated using a gradient descent method. In an embodiment, the parameter node obtains the current training parameter and the model learning rate corresponding to the current training in the current training cycle. The current training parameter is updated according to the model learning rate and the global gradient of the current training process, to obtain an updated training parameter. Specific implementations of updating the training parameter according to the global gradient of the current training process in the disclosure may also be other methods improved based on the gradient descent method, which is not limited herein.

Figure 8:
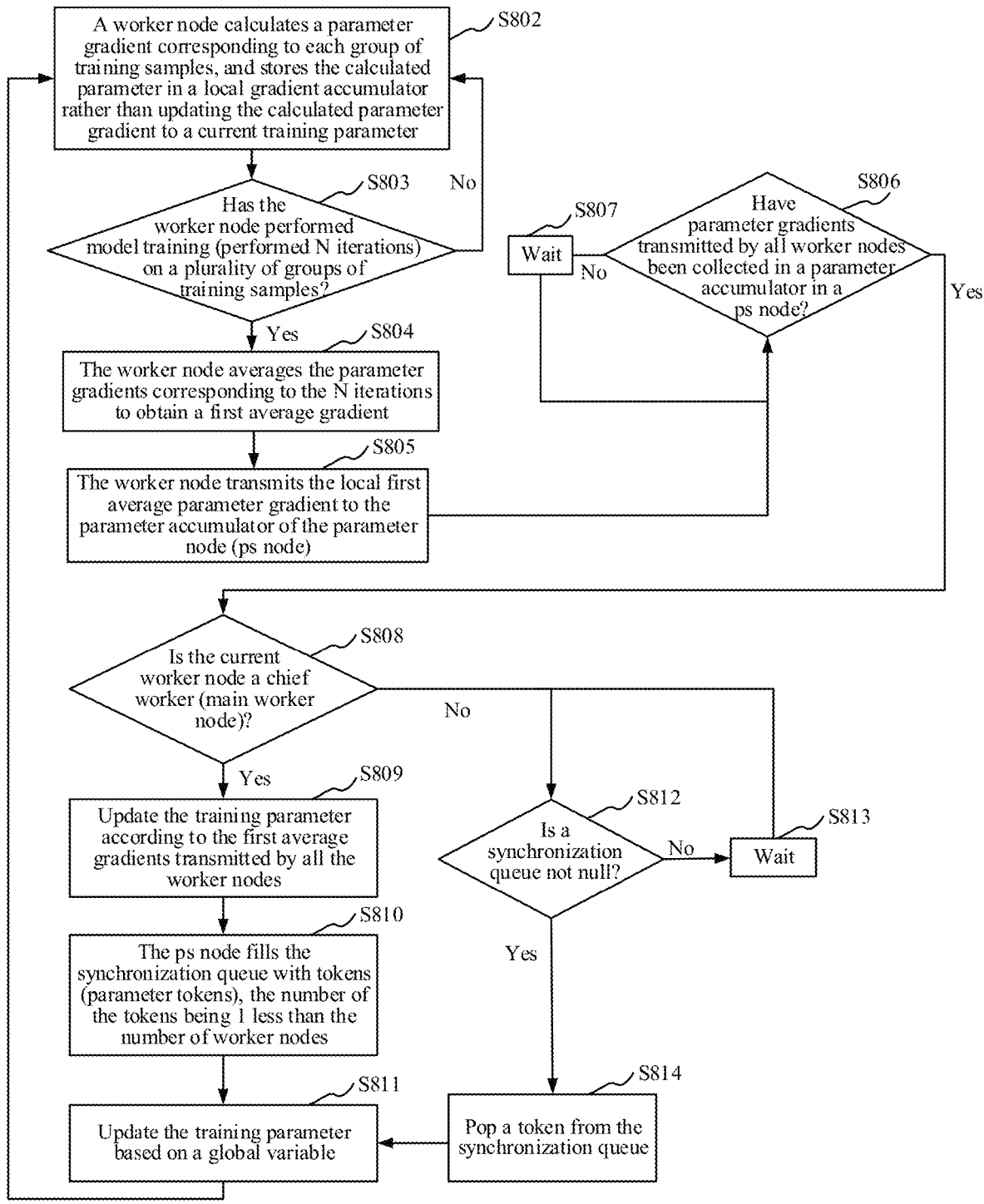
FIG. 8 is an overall execution flowchart of a method for distributed training of a machine learning model according to some embodiments.

FIG. 8 is an overall execution flowchart of a method for distributed training of a machine learning model. Specifically, the method includes the following operations:

Operation S802. A worker node calculates a parameter gradient corresponding to each group of training samples, and stores the calculated parameter gradient in a local gradient accumulator rather than updating the calculated parameter gradient to a current training parameter.

Operation S803. Determine whether the worker node has performed model training (has performed N iterations) on the N groups of training samples. If it is determined that the worker node has performed model training (has performed N iterations) on the N groups of training samples, go to operation S804; otherwise go to operation S802 to continue to calculate the parameter gradient corresponding to the training samples in the worker node, and after N iterations are executed, the operation of calculating the first average gradient is performed.

Operation S804. If it is determined that the worker node has performed model training (has performed N iterations) on the N groups of training samples, the worker node averages the parameter gradients corresponding to the N iterations to obtain a first average gradient.

Operation S805. The worker node transmits the local first average gradient to a parameter accumulator in the parameter node (ps node).

Operation S806. Determine whether parameter gradients transmitted by all the worker nodes have been collected in the parameter accumulator in the ps node. If it is determined that the parameter gradients transmitted by all the worker nodes have been collected in the parameter accumulator in the ps node, go to operation S808. Otherwise, if it is determined that the parameter gradients transmitted by all the worker nodes have not been collected in the parameter accumulator in the ps node, go to operation S807 to continue to wait in the ps node for the first average gradients transmitted by all the worker nodes, and after the parameter gradients transmitted by all the worker nodes have been received, the operation of updating the training parameter is performed.

Operation S808. Determine whether the current worker node is a chief worker node (main worker node). If it is determined that the current worker node is the chief worker node, go to operation S808. Otherwise, if it is determined that the current worker node is a non-main worker node, the non-main worker node, after transmitting the first average gradient to the ps node, accesses the synchronization queue to determine whether it is not null. When the non-main worker node successfully accesses data from the synchronization queue, a token is popped up from the synchronization queue, and the non-main worker node extracts the updated training parameter from the global variable according to the token, and continues to execute a new round of model training according to the updated training parameter.

Operation S808. The ps node updates the training parameter according to the first average gradients transmitted by all the worker nodes.

Operation S810. The ps node fills the synchronization queue with tokens (parameter tokens), the number of the tokens being 1 less than the number of worker nodes.

Operation S811. The ps node updates the training parameter based on a global variable.

A method for distributed training of a machine learning model may be an algorithm for synchronous distributed training. Specifically, the worker node uses an accumulator to perform a plurality of iterations and summation. When the number of iterations reaches a preset number of times, the local gradient obtained by the plurality of iterations of training is transmitted to the parameter node. The parameter node also uses an accumulator to sum the local gradients transmitted by all the worker nodes, and the operation of updating the training parameter is performed only after the local gradients transmitted by all the worker nodes are received. In the process of one time of training parameter updating, accumulators are constructed in the worker node and the parameter node respectively, to aggregate the parameter gradients in the worker node and the parameter node respectively, so that the bandwidth used by the machine can be effectively reduced in each iteration process, thereby increasing the training speed.

Moreover, a method for distributed training of a machine learning model may be applied to fields such as machine learning and deep learning. The algorithm averages the parameter gradients twice by using two layers of accumulators, and then updates the averaged gradient to the variable. This method can effectively lower the frequency of communication between the worker node and the parameter node in the conventional synchronous distributed training process, and avoid the communication of excessively large volume of data which affects the timely communication between different nodes and lowers the speed of model training.

Figure 9:
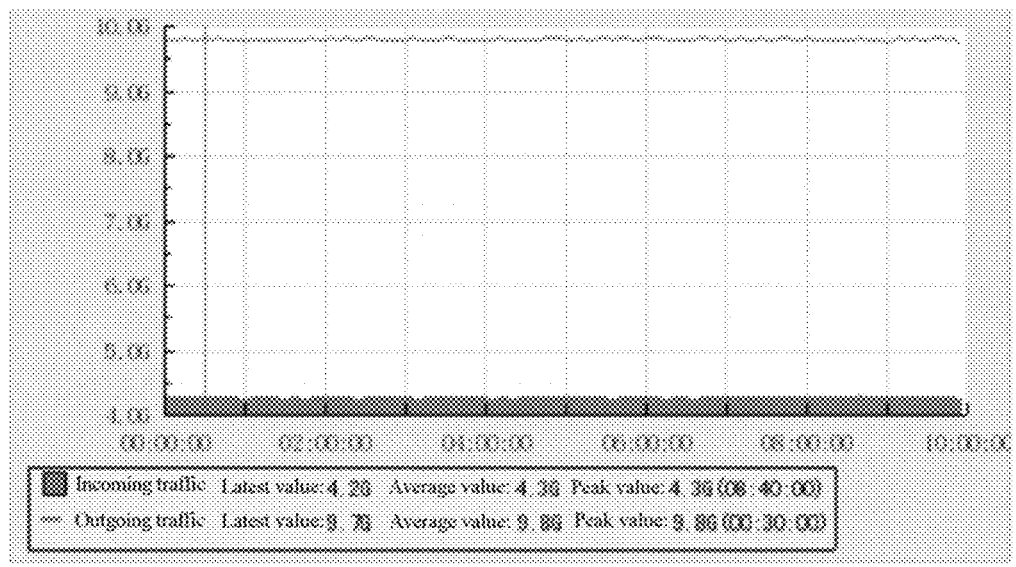
FIG. 9 is a diagram showing traffic of communication between a worker node and a ps node after one time of training according to some embodiments.
Figure 10:
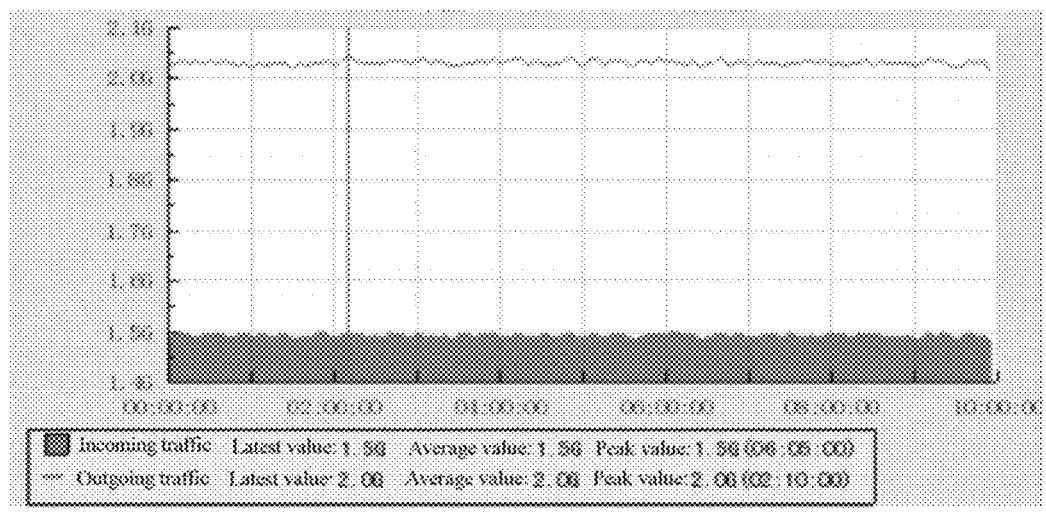
FIG. 10 is a diagram showing traffic of communication between a worker node and a ps node after N times of training according to some embodiments.

FIG. 9 is a diagram showing traffic of communication between a worker node and a ps node after one time of training. In FIG. 9, a network adapter has a bandwidth of 10,000 gigabits. It can be seen from FIG. 9 that the traffic has peaked. FIG. 10 is a diagram showing traffic of communication between a worker node and a ps node after N iterations (N being a positive integer greater than 1). FIG. 9 and FIG. 10 adopt the same hardware and cluster configuration. It can be seen that the outgoing traffic of a single ps node using the method in FIG. 10 is about ⅕ of that in FIG. 9. That is to say, it can be seen from FIG. 9 and FIG. 10 that the training speed of the model can be greatly increased by using the method where the worker node communicates with the ps node after N iterations. In addition, model training performed by the method in some embodiments is no longer constrained by the traffic at the network adapter, and the number of iterations N is also configurable. When N takes a larger value, the worker nodes can use more local computing resources, and the IO communication time between the worker nodes and the ps nodes is further shortened, thereby furthering increasing the speed of model training.

In a specific application scenario, the solution of the present disclosure may be applied to predict a probability that a target user clicks on target promotion information. In this specific application scenario, the worker nodes and the parameter node(s) in the distributed node cluster cooperate to complete the training of the click-through rate prediction model, and then predict the probability value that the target user clicks on the target promotion information according to the trained click-through rate prediction model.

For example, the worker nodes are worker processes and the parameter node is a ps process in the distributed node cluster. The training of the click-through rate prediction model specifically includes: First, two layers of accumulators are constructed. The two layers of accumulators are used to aggregate parameter gradients in the worker process and the ps process respectively. A configurable number N (N being a positive integer greater than 1) is set. When the worker process performs training of the machine learning model based on the same training parameter, the worker process, before the number of iterations of the training samples reaches N, stores a parameter gradient of each iteration in an accumulator corresponding to the worker process, and does not need to update the training parameter according to the parameter gradient. When the number of iterations in the worker process reaches N, the worker process fetches an average gradient of the N parameter gradients accumulated previously from the corresponding accumulator, and returns the average gradient to the ps process. The ps process uses an accumulator to store the average gradients returned by all the worker processes. When the number of average gradients stored is the same as the number of worker processes, the ps process obtains, from its own accumulator, the average gradient returned by each worker process, calculates an average value of the average gradients, and updates the training parameter according to the calculated average value. After the ps process finishes updating of the training parameter, the worker process copies the updated training parameter from the ps process and updates the current training parameter in the worker node. The worker process continues to start a new round of N-iteration training process according to the updated training parameter, and does not stop the training of the machine learning model until a training end condition is met, so as to obtain a click-through rate prediction model.

In an example application scenario, the prediction of the probability value that the target user clicks on the target promotion information according to the trained click-through rate prediction model specifically may include: inputting to-be-processed data related to the target user and target promotion information into the trained click-through rate prediction model, so that the click-through rate prediction model processes the to-be-processed data and outputs information representing the probability that the target user clicks on the target promotion information.

The method for distributed training of a machine learning model may also be applied to other application scenarios. For example, the method may be applied to an application scenario of image classification, in which case the corresponding training samples may be image data of different categories; or the method may be applied to an application scenario of text recognition, in which case the corresponding training samples may be data in text form, and so on, which is not limited herein.

It is to be understood that, although the operations in the flowcharts of FIG. 2, FIG. 7, and FIG. 8 are sequentially displayed according to indication of arrows, the operations are not necessarily sequentially performed in the sequence indicated by the arrows. Unless otherwise explicitly specified in the disclosure, execution of the operations is not strictly limited, and the operations may be performed in other sequences. In addition, at least some operations in FIG. 2, FIG. 7, and FIG. 8 may include a plurality of operations or a plurality of stages. The operations or the stages are not necessarily performed at the same moment, and instead may be performed at different moments. The operations or the stages are not necessarily performed sequentially, and instead may be performed in turn or alternately with another operation or at least some of operations or stages of the another operation.

Figure 11:
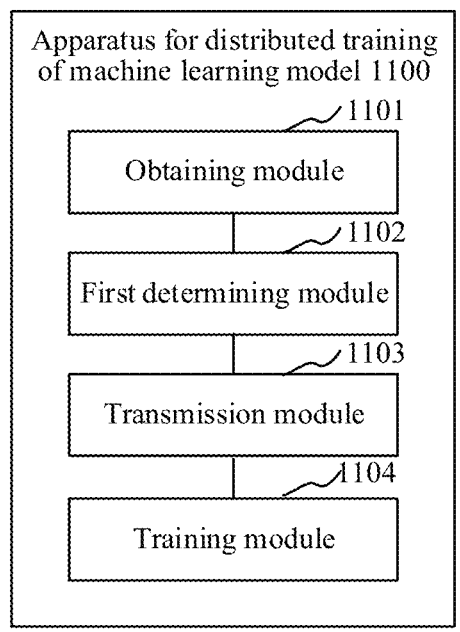
FIG. 11 is a structural block diagram of an apparatus for distributed training of a machine learning model according to some embodiments.

As shown in FIG. 11, in an embodiment, an apparatus for distributed training of a machine learning model 1100 is provided, including: an obtaining module 1101, a first determining module 1102, a transmission module 1103, and a training module 1104.

The obtaining module 1101 is configured to obtain more than one group of training samples, and processing each group of training samples separately according to a current training parameter of a machine learning model to obtain a corresponding parameter gradient.

The first determining module 1102 is configured to determine a local gradient of a current training process based on the parameter gradient corresponding to each group of training samples.

The transmission module 1103 is configured to transmit the local gradient of the current training process to a parameter node, the transmitted local gradient being used for instructing the parameter node to determine a global gradient of the current training process based on a local gradient set of the current training process, and update the training parameter according to the global gradient of the current training process, and the local gradient set of the current training process including local gradients respectively transmitted by worker nodes in the distributed node cluster in the current training process.

The training module 1104 is configured to obtain the updated training parameter from the parameter node, use the updated training parameter as a current training parameter in a next training cycle, return to the operation of obtaining more than one group of training samples and processing each group of training samples respectively according to a current training parameter of a machine learning model to obtain a corresponding parameter gradient, and continue to perform the training until a training end condition is met.

In an embodiment, the obtaining module 1101 may be further configured to obtain a training subset divided from a training set and correspondingly allocated to the worker node, where training subsets respectively correspondingly allocated to the worker nodes in the distributed node cluster constitute the training set; and obtain a preset number of groups of training samples from the training subset, the preset number being greater than one.

In an embodiment, the obtaining module 1101 may be further configured to sequentially read a group of training samples to be processed in a current training cycle from the training subset; and in the current training cycle, for a group of training samples read each time, respectively process the read group of training samples according to the current training parameter of the machine learning model to obtain the corresponding parameter gradient; and in response to a number of obtained parameter gradients reaching the preset number, stop reading of training samples in the current training cycle.

In an embodiment, the obtaining module 1101 may be further configured to perform model processing on each group of training samples according to the current training parameter of the machine learning model, to obtain a prediction result corresponding to each group of training samples; obtain a reference result corresponding to each group of training samples; determine a target loss value according to the reference result and the prediction result; and determine the parameter gradient corresponding to each group of the training samples according to the target loss value.

In an embodiment, the first determining module 1102 may be further configured to determine a first gradient sum corresponding to the current training cycle according to the parameter gradients respectively corresponding to the more than one group of training samples; calculate a first average gradient according to the first gradient sum and a first number corresponding to the training samples, the first number corresponding to the training samples being a total number of groups of training samples read by a worker node in a training cycle; and use the first average gradient as the local gradient corresponding to the current training cycle.

In an embodiment, the first determining module 1102 may be further configured to determine a plurality of gradient values respectively corresponding to each model parameter based on the parameter gradient corresponding to each group of training samples; for each model parameter in the plurality of model parameters, calculate a total gradient value according to the plurality of gradient values corresponding to the current model parameter; for each model parameter in the plurality of model parameters, determine a first average gradient of the current model parameter according to the total gradient value of the current model parameter and a first number corresponding to the training samples, the first number corresponding to the training samples being a total number of groups of training samples read by a worker node in a training cycle; and use the first average gradient of each model parameter as the local gradient corresponding to the current training cycle.

In an embodiment, the training module 1104 may be further configured to poll a synchronization queue after the local gradient of the current training process is transmitted to the parameter node; and in a case that a parameter token is accessed from the synchronization queue, obtaining the updated training parameter from the parameter node based on the parameter token, the parameter token being stored in the synchronization queue by a main worker node in the distributed node cluster after receiving an instruction indicating that the updating of the training parameter is complete from the parameter node.

In an embodiment, the training module 1104 may further configured to obtain the updated training parameter from the parameter node, use the updated training parameter as a current training parameter in a next training cycle, return to the operation of obtaining more than one group of training samples and processing each group of training samples respectively according to a current training parameter of a machine learning model to obtain a corresponding parameter gradient, and continue to perform the training until a training stop condition is met.

In an embodiment, the apparatus for distributed training of a machine learning model 1100 may further include a prediction module 1205, which, in one embodiment, is configured to: obtain a trained click-through rate prediction model; obtain first to-be-processed data related to a target user and second to-be-processed data related to target promotion information; and process at least one of the first to-be-processed data or the second to-be-processed data by using the trained click-through rate prediction model and output a predicted click-through rate, the predicted click-through rate being used for representing a probability that the target user clicks on the target promotion information.

In an embodiment, the prediction module 1105 may be further configured to: obtain user attribute data and user behavior data corresponding to the target user; obtain a promotion content and promotion attribute data corresponding to the target promotion information; determine an input feature according to at least one of the user attribute data, the user behavior data, the promotion content, or the promotion attribute data; and input the input feature into the trained click-through rate prediction model, so that the trained click-through rate prediction model processes the input feature and outputs the predicted click-through rate.

In the above apparatus for distributed training of a machine learning model, in each training cycle, a worker node in a distributed node cluster obtains more than one group of training samples, and processes each group of training samples respectively according to a current training parameter of a machine learning model to obtain a parameter gradient corresponding to each group of training samples. In the process of training the machine learning model based on a plurality of groups of training samples in the worker node, the training parameter is not updated, but instead, the same training parameter is used to calculate the parameter gradients, which improves the accuracy of calculation of the parameter gradients. In addition, the worker node further stores the parameter gradient corresponding to each group of training samples until the training of all groups of training samples is completed. The worker node determines the local gradient of the current training process according to the parameter gradient corresponding to each group of training samples, and transmits the local gradient of the current training process to the parameter node. Therefore, only after the worker node performs a plurality of model training iterations with local resources, will the worker node communicate and interact with the parameter node once, thereby reducing the frequency of communication between different nodes. In addition, in the current training cycle, the parameter node may determine the global gradient of the current training process based on the local gradients respectively transmitted by the worker nodes in the distributed node cluster in the current training process, and update the training parameter according to the global gradient of the current training process. The worker node may obtain the updated training parameter from the parameter node, and continue to perform model training corresponding to the next training cycle based on the updated training parameter, until the training end condition is met. In the process of distributed training of the machine learning model, only after the parameter gradients corresponding to a plurality of groups of training samples are obtained in each worker node, will the parameter gradients be transmitted to the parameter node, which reduces the number of interactions between the worker nodes and the parameter node, and effectively reduces the incoming and outgoing traffic during the training of the machine learning model, thereby improving the efficiency of training the machine learning model.

Figure 12:
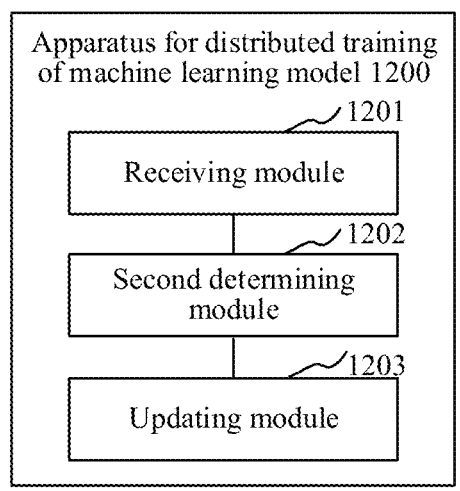
FIG. 12 is a structural block diagram of an apparatus for distributed training of a machine learning model according to some embodiments.

As shown in FIG. 12, in an embodiment, an apparatus for distributed training of a machine learning model 1200 is provided, including: a receiving module 1201, a second determining module 1202, and an updating module 1203.

The receiving module 1201 is configured to receive, in a current training cycle, local gradients respectively transmitted by worker nodes in a distributed node cluster, each local gradient being determined by a parameter gradient obtained by the corresponding worker node by processing each group of training samples in more than one group of training samples according to a current training parameter of a machine learning model.

The second determining module 1202 is configured to determine a global gradient of the current training process based on local gradients respectively transmitted by worker nodes in the distributed node cluster in the current training process.

The updating module 1203 is configured to update the training parameter according to the global gradient of the current training process, the updated training parameter being used for being transmitted to the worker nodes in the distributed node cluster to trigger the worker nodes to continue to perform model training on the machine learning model based on the updated training parameter until a training end condition is met.

In an embodiment, the second determining module 1202 may be further configured to determine a second gradient sum corresponding to the current training cycle according to the local gradients respectively corresponding to the worker nodes in the distributed node cluster in the current training cycle; calculate a second average gradient according to the second gradient sum and a second number corresponding to the worker nodes; and use the second average gradient as the global gradient corresponding to the current training cycle.

In an embodiment, the updating module 1203 may be further configured to: obtain the current training parameter and a model learning rate in the current training cycle; and update the current training parameter according to the model learning rate and the global gradient of the current training process, to obtain an updated training parameter.

In the apparatus for distributed training of a machine learning model, in the current training cycle, a parameter node in a distributed node cluster receives local gradients respectively transmitted by worker nodes in the distributed node cluster. Each local gradient is determined by a parameter gradient obtained by the corresponding worker node by processing each group of training samples in more than one group of training samples according to a current training parameter of a machine learning model. In the current training cycle, the same training parameter is used to perform model training based on a plurality of groups of training samples, which improves the accuracy of calculation of the parameter gradients. In addition, each data interaction process between the worker node and the parameter node includes parameter gradient values corresponding to a plurality of groups of training samples, which also reduces the number of interactions between different nodes, thereby improving the efficiency of model training. The parameter node determines a global gradient of the current training process based on the local gradients respectively transmitted by the worker nodes in the distributed node cluster in the current training process. In this way, the parameter node performs the global gradient calculation process once only after receiving the local gradients transmitted by all the worker nodes, which reduces the calculation frequency of the parameter node. Then the parameter node updates the training parameter according to the global gradient of the current training process, the updated training parameter being used for being transmitted to the worker nodes in the distributed node cluster to trigger the worker nodes to continue to perform model training on the machine learning model based on the updated training parameter until a training end condition is met. In this way, the worker node may perform a plurality of times of model iteration training with local resources as much as possible, and the parameter node performs the operations of determining the global gradient and updating the training parameter only after receiving the local gradients transmitted by all the worker nodes. This reduces the number of communication interactions between the worker nodes and the parameter node, and effectively reduces the incoming and outgoing traffic of the machines, thereby improving the efficiency of training the machine learning model.

For a detailed description of the apparatus for distributed training of a machine learning model, reference may be made to the description of the above method for distributed training of a machine learning model, which will not be repeated herein. The modules in the above apparatus for distributed training of a machine learning model may be implemented entirely or partly by software (i.e., code), hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server or a terminal, and an internal structure diagram thereof may be shown in FIG. 13. The computer device includes a processor, a memory, and a network interface that are connected by using a system bus. The processor of the computer device is configured to provide computing and control capabilities. The memory of the computer device includes a non-volatile computer-readable storage medium and an internal memory. The non-volatile storage medium stores an operating system and a computer program. The internal memory provides an environment for running of the operating system and the computer program in the non-volatile storage medium. The database of the computer device is configured to store data related to the training samples. The network interface of the computer device is configured to communicate with an external terminal through a network connection. The computer program, when executed by the processor, implements the method for distributed training of a machine learning model.

Figure 13:
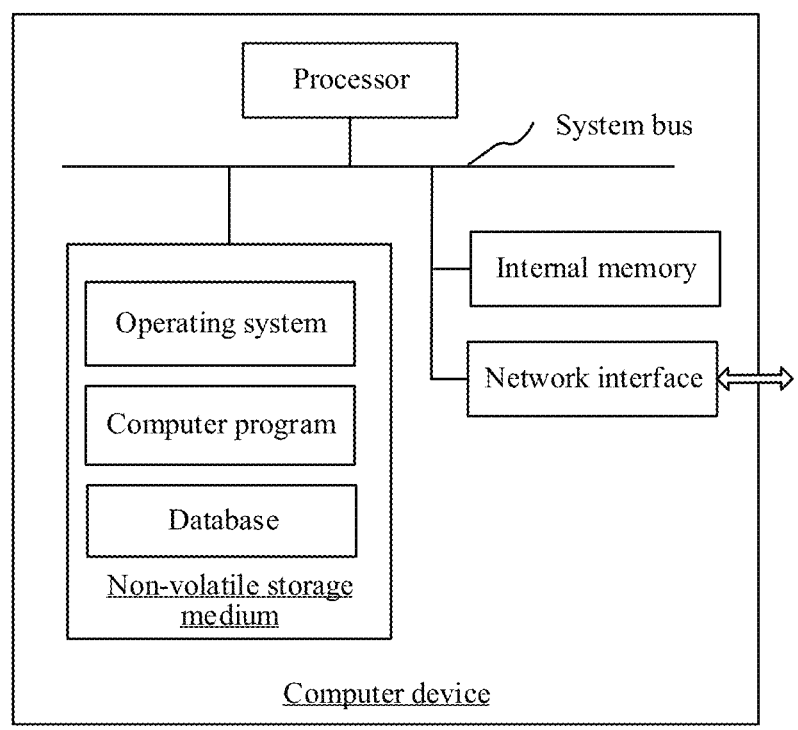
FIG. 13 is a diagram showing an internal structure of a computer device according to some embodiments.

A person skilled in the art may understand that, the structure shown in FIG. 13 is only a block diagram of a part of a structure related to a solution of the disclosure and does not limit the computer device to which the solution is applied. Specifically, the computer device may include more or fewer components than those in the drawings, or include a combination of some components, or include different component layouts.

In an embodiment, a computer device is further provided, including a memory and one or more processors, the memory storing computer-readable instructions, the computer-readable instructions, when executed by the one or more processors, causing the one or more processors to perform the operations in the above method embodiments.

In an embodiment, one or more non-volatile readable storage media storing computer-readable instructions are provided, the computer-readable instructions, when executed by one or more processors, causing the one or more processors to perform the operations in the above method embodiments.

In an embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the operations in the foregoing method embodiments.

A person of ordinary skill in the art may understand that all or some of procedures of the method in the foregoing embodiments may be implemented by a computer program by instructing relevant hardware. The program may be stored in a non-volatile computer-readable storage medium. When the program is executed, the procedures of the foregoing method embodiments may be implemented. Any reference to a memory, a storage, a database, or another medium used in the foregoing embodiments may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

After considering the specification and practicing the disclosed embodiments, a person skilled in the art may easily conceive of other embodiments of the disclosure. The disclosure is intended to cover any variations, uses, or adaptive changes of the disclosure following the general principles of the disclosure, and includes well-known knowledge and conventional technical means in the art and undisclosed in the disclosure.

It is to be understood that the disclosure is not limited to the precise structures described above and shown in the accompanying drawings, and various modifications and changes may be made without departing from the scope of the disclosure. The scope of the disclosure is subject only to the appended claims.

What is claimed is:

1. A method for distributed training of a machine learning model, performed by a computer device, the method comprising:
obtaining more than one group of training samples and processing each group of training samples separately according to a current training parameter of a machine learning model to obtain a corresponding parameter gradient;
determining a local gradient of a current training process based on the parameter gradient corresponding to each group of training samples;
transmitting the local gradient of the current training process to a parameter node, the transmitted local gradient being used for instructing the parameter node to determine a global gradient of the current training process based on a local gradient set of the current training process, and update a training parameter according to the global gradient of the current training process, and the local gradient set of the current training process comprising local gradients respectively transmitted by worker nodes in a distributed node cluster in the current training process; and
obtaining the updated training parameter from the parameter node, using the updated training parameter as a new current training parameter in a next training cycle, returning to the operation of obtaining more than one group of training samples and processing each group of training samples respectively according to the new current training parameter of the machine learning model to obtain a corresponding parameter gradient, and continuing to perform the training until a training end condition is met.

2. The method according to claim 1, wherein the obtaining more than one group of training samples comprises:
obtaining a training subset divided from a training set and correspondingly allocated to the worker node, wherein training subsets respectively correspondingly allocated to the worker nodes in the distributed node cluster constitute the training set; and
obtaining a preset number of groups of training samples from the training subset, the preset number being greater than one.

3. The method according to claim 2, wherein the obtaining a preset number of groups of training samples from the training subset comprises:
sequentially reading a group of training samples to be processed in a current training cycle from the training subset; and
the processing each group of training samples respectively according to a current training parameter of a machine learning model to obtain a corresponding parameter gradient comprises:
in the current training cycle, for the group of training samples read each time, respectively processing the read group of training samples according to the current training parameter of the machine learning model to obtain the corresponding parameter gradient; and
in response to a number of obtained parameter gradients reaching the preset number, stopping reading of training samples in the current training cycle.

4. The method according to claim 1, wherein the processing each group of training samples respectively according to a current training parameter of a machine learning model to obtain a corresponding parameter gradient comprises:
performing model processing on each group of training samples according to the current training parameter of the machine learning model to obtain a prediction result corresponding to each group of training samples;
obtaining a reference result corresponding to each group of training samples;
determining a target loss value according to the reference result and the prediction result; and
determining the parameter gradient corresponding to each group of the training samples according to the target loss value.

5. The method according to claim 1, wherein the determining a local gradient of a current training process based on the parameter gradient corresponding to each group of training samples comprises:
determining a first gradient sum corresponding to the current training cycle according to the parameter gradients respectively corresponding to the more than one group of training samples;
calculating a first average gradient according to the first gradient sum and a first number corresponding to the training samples, the first number corresponding to the training samples being a total number of groups of training samples read by a worker node in a training cycle; and
using the first average gradient as the local gradient corresponding to the current training cycle.

6. The method according to claim 1, wherein the training parameter comprises more than one model parameter, and the parameter gradient comprises gradient values corresponding to the model parameters; and
the determining a local gradient of a current training process based on the parameter gradient corresponding to each group of training samples comprises:
determining a plurality of gradient values respectively corresponding to each model parameter based on the parameter gradient corresponding to each group of training samples;
for each model parameter in the plurality of model parameters, calculating a total gradient value according to the plurality of gradient values corresponding to the current model parameter;
for each model parameter in the plurality of model parameters, determining a first average gradient of the current model parameter according to the total gradient value of the current model parameter and a first number corresponding to the training samples, the first number corresponding to the training samples being a total number of groups of training samples read by a worker node in a training cycle; and
using the first average gradient of each model parameter as the local gradient corresponding to the current training cycle.

7. The method according to claim 1, wherein the obtaining the updated training parameter from the parameter node comprises:
polling a synchronization queue after transmitting the local gradient of the current training process to the parameter node; and
in a case that a parameter token is accessed from the synchronization queue, obtaining the updated training parameter from the parameter node based on the parameter token, the parameter token being stored in the synchronization queue by a main worker node in the distributed node cluster after receiving an instruction indicating that the updating of the training parameter is complete from the parameter node.

8. The method according to claim 1, wherein the machine learning model comprises a click-through rate prediction model, and the method further comprises:
 obtaining a trained click-through rate prediction model;
 obtaining to-be-processed data related to a target user and target promotion information; and
 processing the to-be-processed data by using the trained click-through rate prediction model and outputting a predicted click-through rate, the predicted click-through rate being used for representing a probability that the target user clicks on the target promotion information.

9. The method according to claim 8, wherein the obtaining to-be-processed data related to a target user and target promotion information comprises:
 obtaining user attribute data and user behavior data corresponding to the target user;
 obtaining a promotion content and promotion attribute data corresponding to the target promotion information; and
 determining an input feature according to at least one of the user attribute data, the user behavior data, the promotion content, or the promotion attribute data; and
 the processing the to-be-processed data by using the trained click-through rate prediction model and outputting a predicted click-through rate comprises:
 inputting the input feature into the trained click-through rate prediction model, so that the trained click-through rate prediction model processes the input feature and outputs the predicted click-through rate.

10. A system for distributed training of a machine learning model, the system comprising:
 at least one memory storing program code; and
 at least one processor configured to read the program code and operate as instructed by the program code, the program code comprising:
 obtaining code configured to cause the at least one processor to obtain more than one group of training samples, and processing each group of training samples separately according to a current training parameter of a machine learning model to obtain a corresponding parameter gradient;
 first determining code configured to cause the at least one processor to determine a local gradient of a current training process based on the parameter gradient corresponding to each group of training samples;
 transmission code configured to cause the at least one processor to transmit the local gradient of the current training process to a parameter node, the transmitted local gradient being used for instructing the parameter node to determine a global gradient of the current training process based on a local gradient set of the current training process, and update a training parameter according to the global gradient of the current training process, and the local gradient set of the current training process comprising local gradients respectively transmitted by worker nodes in a distributed node cluster in the current training process; and
 training code configured to cause the at least one processor to obtain the updated training parameter from the parameter node, use the updated training parameter as a new current training parameter in a next training cycle, return to the operation of obtaining more than one group of training samples and processing each group of training samples respectively according to the new current training parameter of the machine learning model to obtain a corresponding parameter gradient, and continue to perform the training until a training end condition is met.

11. The system according to claim 10, wherein the obtaining code is further configured to cause the at least one processor to:
 obtain a training subset divided from a training set and correspondingly allocated to the worker node, wherein training subsets respectively correspondingly allocated to the worker nodes in the distributed node cluster constitute the training set; and
 obtain a preset number of groups of training samples from the training subset, the preset number being greater than one.

12. The system according to claim 11, wherein the obtaining code is further configured to cause the at least one processor to:
 sequentially read a group of training samples to be processed in a current training cycle from the training subset;
 in the current training cycle, for the group of training samples read each time, respectively process the read group of training samples according to the current training parameter of the machine learning model to obtain the corresponding parameter gradient; and
 in response to a number of obtained parameter gradients reaching the preset number, stop reading of training samples in the current training cycle.

13. The system according to claim 10, wherein the obtaining code is further configured to cause the at least one processor to:
 perform model processing on each group of training samples according to the current training parameter of the machine learning model to obtain a prediction result corresponding to each group of training samples;
 obtain a reference result corresponding to each group of training samples;
 determine a target loss value according to the reference result and the prediction result; and
 determine the parameter gradient corresponding to each group of the training samples according to the target loss value.

14. The system according to claim 10, wherein the first determining code is further configured to cause the at least one processor to:
 determine a first gradient sum corresponding to the current training cycle according to the parameter gradients respectively corresponding to the more than one group of training samples;
 calculate a first average gradient according to the first gradient sum and a first number corresponding to the training samples, the first number corresponding to the training samples being a total number of groups of training samples read by a worker node in a training cycle; and
 use the first average gradient as the local gradient corresponding to the current training cycle.

15. The system according to claim 10, wherein the training parameter comprises more than one model parameter and the parameter gradient comprises gradient values corresponding to the model parameters; and
 the first determining code is further configured to cause the at least one processor to:
 determine a plurality of gradient values respectively corresponding to each model parameter based on the parameter gradient corresponding to each group of training samples;

for each model parameter in the plurality of model parameters, calculate a total gradient value according to the plurality of gradient values corresponding to the current model parameter;

for each model parameter in the plurality of model parameters, determine a first average gradient of the current model parameter according to the total gradient value of the current model parameter and a first number corresponding to the training samples, the first number corresponding to the training samples being a total number of groups of training samples read by a worker node in a training cycle; and use the first average gradient of each model parameter as the local gradient corresponding to the current training cycle.

16. The system according to claim 10, wherein the training code is further configured to cause the at least one processor to:

poll a synchronization queue after transmitting the local gradient of the current training process to the parameter node; and in a case that a parameter token is accessed from the synchronization queue, obtain the updated training parameter from the parameter node based on the parameter token, the parameter token being stored in the synchronization queue by a main worker node in the distributed node cluster after receiving an instruction indicating that the updating of the training parameter is complete from the parameter node.

17. The system according to claim 10, wherein the machine learning model comprises a click-through rate prediction model, and the program code further comprises prediction code configured to cause the at least one processor to:

obtain a trained click-through rate prediction model;

obtain to-be-processed data related to a target user and target promotion information; and process the to-be-processed data by using the trained click-through rate prediction model and output a predicted click-through rate, the predicted click-through rate being used for representing a probability that the target user clicks on the target promotion information.

18. The system according to claim 17, wherein the prediction code is further configured to cause the at least one processor to:

obtain user attribute data and user behavior data corresponding to the target user;

obtain a promotion content and promotion attribute data corresponding to the target promotion information; and determine an input feature according to at least one of the user attribute data, the user behavior data, the promotion content, or the promotion attribute data; and input the input feature into the trained click-through rate prediction model, so that the trained click-through rate prediction model processes the input feature and outputs the predicted click-through rate.

19. A non-volatile computer-readable storage medium, storing computer program code that when executed by one or more processors causes the one or more processors to:

obtain more than one group of training samples and processing each group of training samples separately according to a current training parameter of a machine learning model to obtain a corresponding parameter gradient;

determine a local gradient of a current training process based on the parameter gradient corresponding to each group of training samples;

transmit the local gradient of the current training process to a parameter node, the transmitted local gradient being used for instructing the parameter node to determine a global gradient of the current training process based on a local gradient set of the current training process, and update a training parameter according to the global gradient of the current training process, the local gradient set of the current training process comprising local gradients respectively transmitted by worker nodes in a distributed node cluster in the current training process; and obtain the updated training parameter from the parameter node, use the updated training parameter as a new current training parameter in a next training cycle, return to the operation of obtaining more than one group of training samples and processing each group of training samples respectively according to the new current training parameter of the machine learning model to obtain a corresponding parameter gradient, and continue to perform the training until a training end condition is met.

20. The non-volatile computer-readable storage medium according to claim 19, wherein the obtain more than one group of training samples comprises:

obtaining a training subset divided from a training set and correspondingly allocated to the worker node, wherein training subsets respectively correspondingly allocated to the worker nodes in the distributed node cluster constitute the training set; and obtaining a preset number of groups of training samples from the training subset, the preset number being greater than one.

* * * * *